US009849617B2

(12) United States Patent
Huber

(10) Patent No.: US 9,849,617 B2
(45) Date of Patent: *Dec. 26, 2017

(54) INSERTABLE APERTURE MOLDING

(71) Applicant: Gregory Arther Huber, Manteca, CA (US)

(72) Inventor: Gregory Arther Huber, Manteca, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,760

(22) Filed: Jan. 9, 2017

(65) Prior Publication Data
US 2017/0113387 A1 Apr. 27, 2017

Related U.S. Application Data

(63) Continuation-in-part of application No. 14/754,396, filed on Jun. 29, 2015, now Pat. No. 9,539,743.

(51) Int. Cl.
*B29C 45/14* (2006.01)
*H01L 21/56* (2006.01)
*B29C 45/26* (2006.01)
*B29C 45/53* (2006.01)

(52) U.S. Cl.
CPC .......... *B29C 45/2628* (2013.01); *B29C 45/53* (2013.01); *B29K 2821/00* (2013.01); *B29K 2905/12* (2013.01)

(58) Field of Classification Search
CPC . B29C 33/305; B29C 33/306; B29C 33/3842; B29C 45/14655
See application file for complete search history.

(56) References Cited

U.S. PATENT DOCUMENTS

| | | | | |
|---|---|---|---|---|
| 3,103,705 A | * | 9/1963 | Letica | B22D 17/22 164/342 |
| 3,287,766 A | * | 11/1966 | Drabert | B29C 45/53 100/237 |
| 4,347,211 A | * | 8/1982 | Bandoh | B29C 45/02 257/E21.504 |
| 4,867,668 A | * | 9/1989 | Miyairi | B29C 45/2673 101/394 |
| 5,059,105 A | * | 10/1991 | Baird | B29C 33/0044 100/211 |

(Continued)

FOREIGN PATENT DOCUMENTS

| | | | | |
|---|---|---|---|---|
| EP | 0907794 A1 | * | 4/1999 | ............... D21F 1/66 |
| FR | 2413201 A1 | * | 7/1979 | ........... B29C 43/021 |
| JP | 62099126 A | * | 5/1987 | ......... B29C 45/2673 |

*Primary Examiner* — Robert B Davis

(57) ABSTRACT

Top and bottom ferrous carrier plates have a plurality of pairs of mating insert receptacles in full carrier plates and interlocked partial carrier plates. Pairs of mating nonferrous pre-molded inserts with mating mold cavities insert with a three axis floating fit into mating insert receptacles. Insert contact faces each comprising a flat surface portion having a plurality of mating alignment elements adapted for automatic precision alignment of the mating pair of pre-molded inserts. An injector structure comprising a plunger and pot bushing structure communicates with a pot on each top pre-molded insert. The bushing structure has a solidifying cavity and stripping structure so that retraction of the plunger separates the solidified material from the plunger face for automatic removal of surplus injected material after each molding cycle.

14 Claims, 20 Drawing Sheets

(56) References Cited

U.S. PATENT DOCUMENTS

| | | | | |
|---|---|---|---|---|
| 5,252,051 A | * | 10/1993 | Miyamoto | B29C 45/14655 249/68 |
| 5,344,296 A | * | 9/1994 | Laninga | B29C 45/2608 249/95 |
| 6,472,252 B2 | * | 10/2002 | Mess | B29C 45/14655 257/E21.504 |
| 6,857,865 B2 | * | 2/2005 | Tsai | B29C 45/14655 425/116 |
| 7,008,575 B2 | * | 3/2006 | Ogata | B29C 45/14065 264/40.5 |
| 9,539,743 B2 | * | 1/2017 | Huber | B29C 33/303 |
| 2007/0122514 A1 | * | 5/2007 | Tsai | B29C 33/303 425/190 |

* cited by examiner

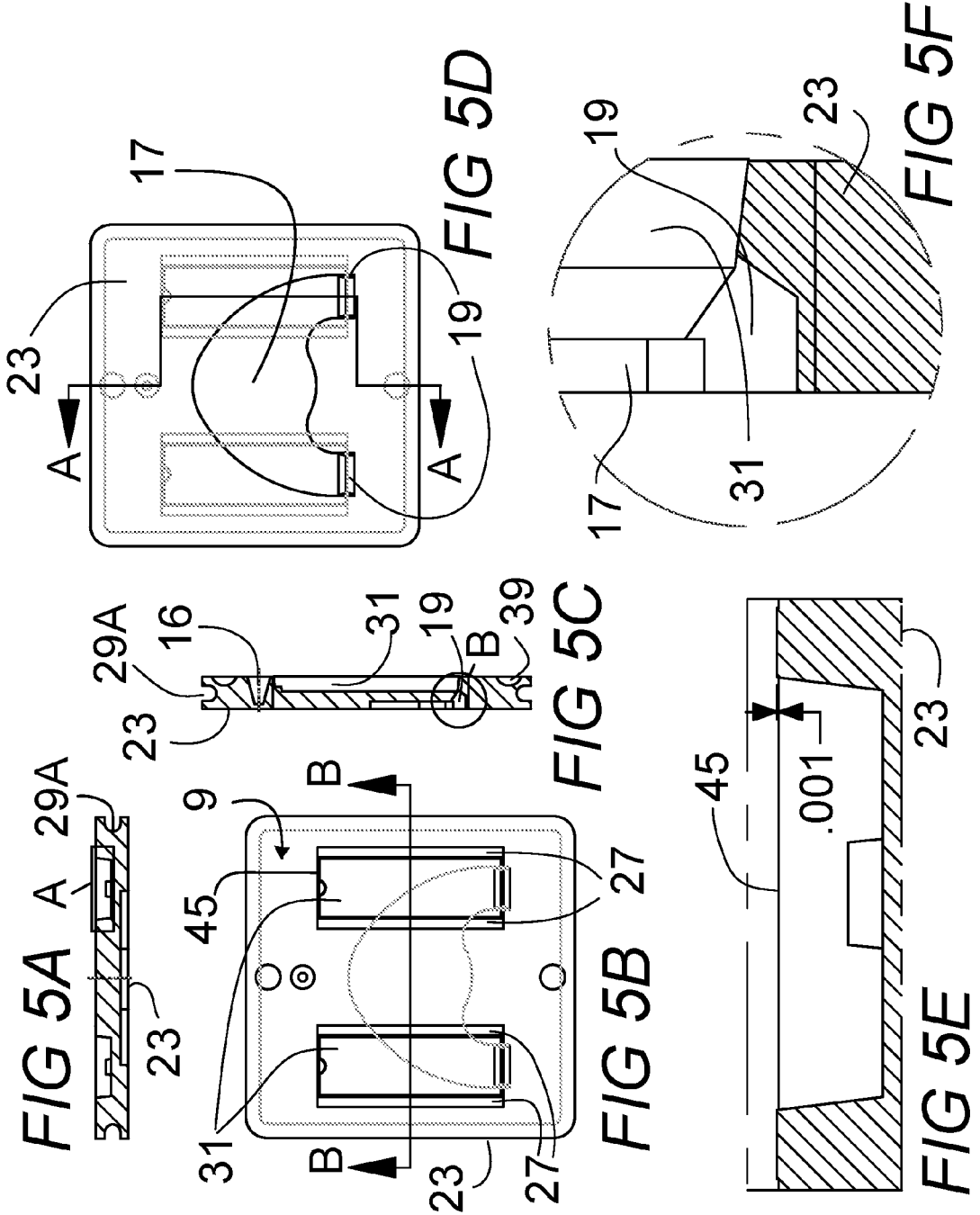

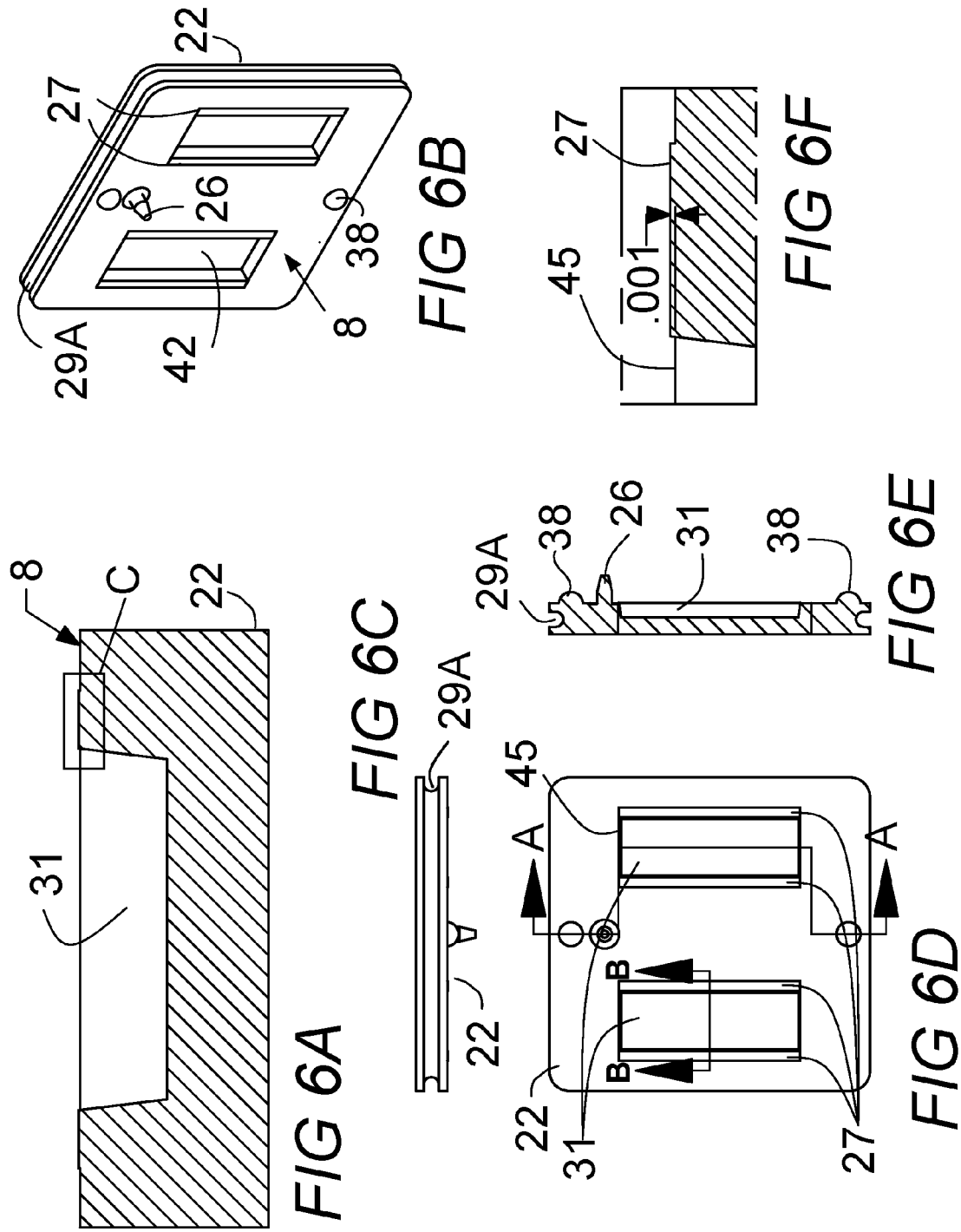

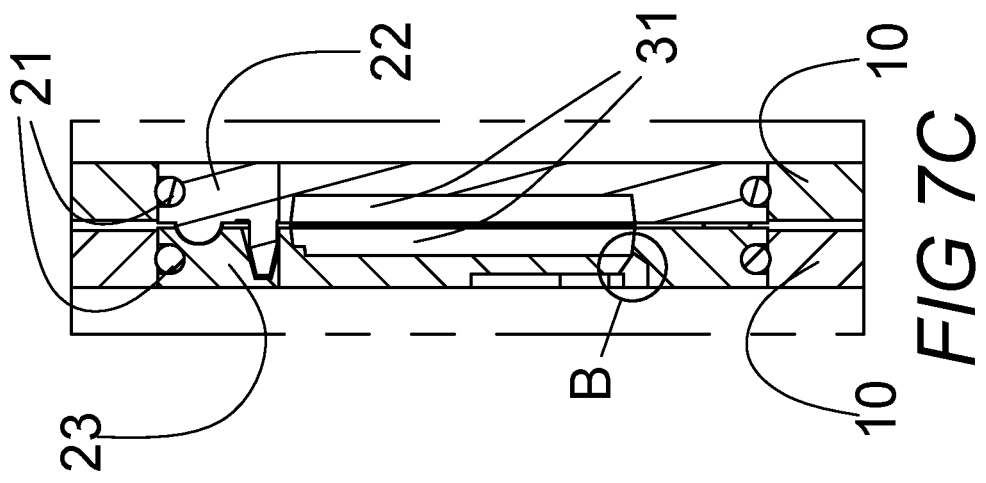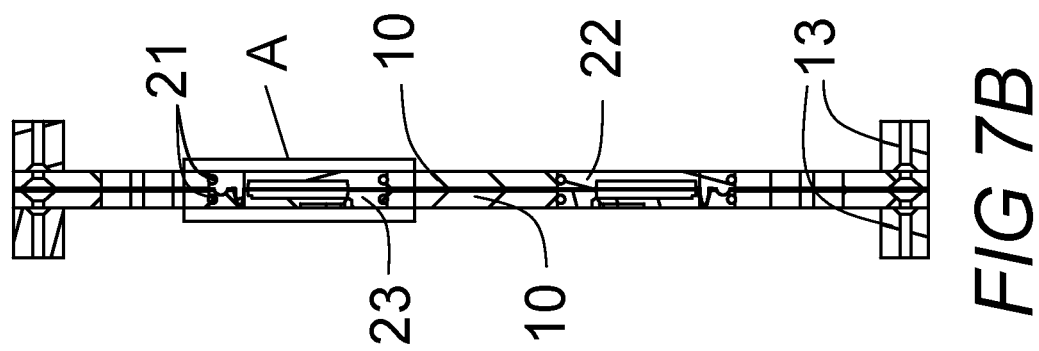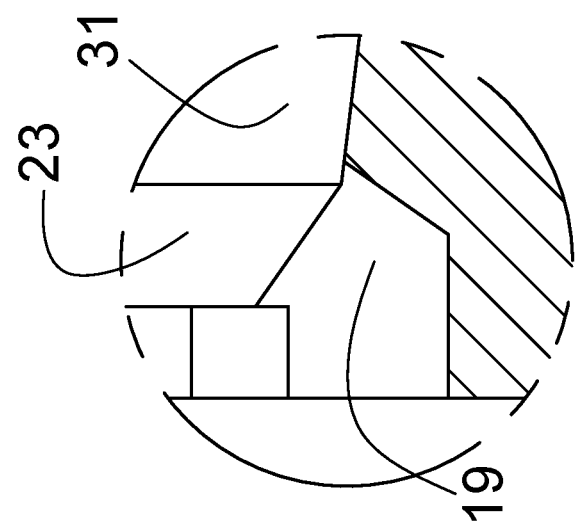

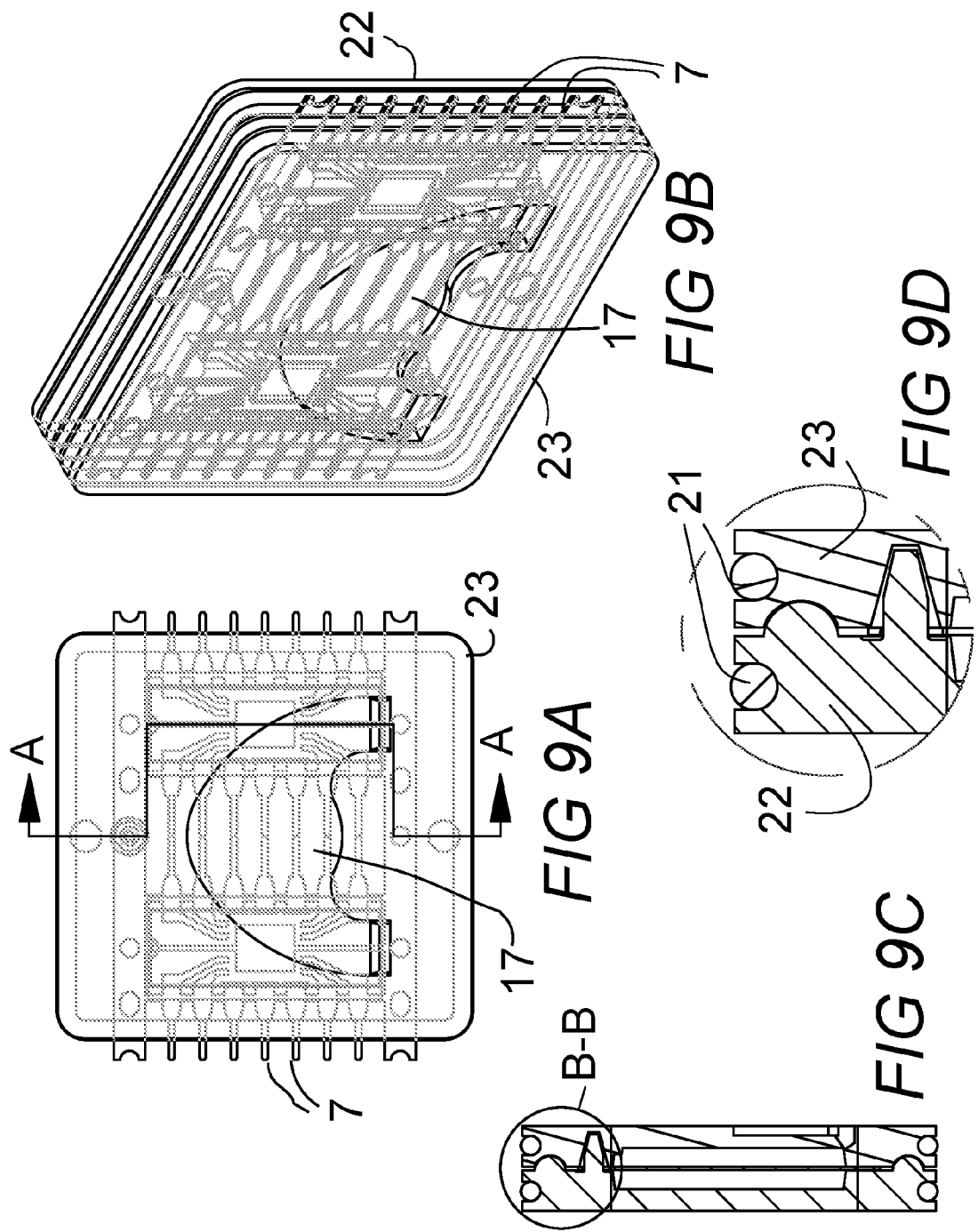

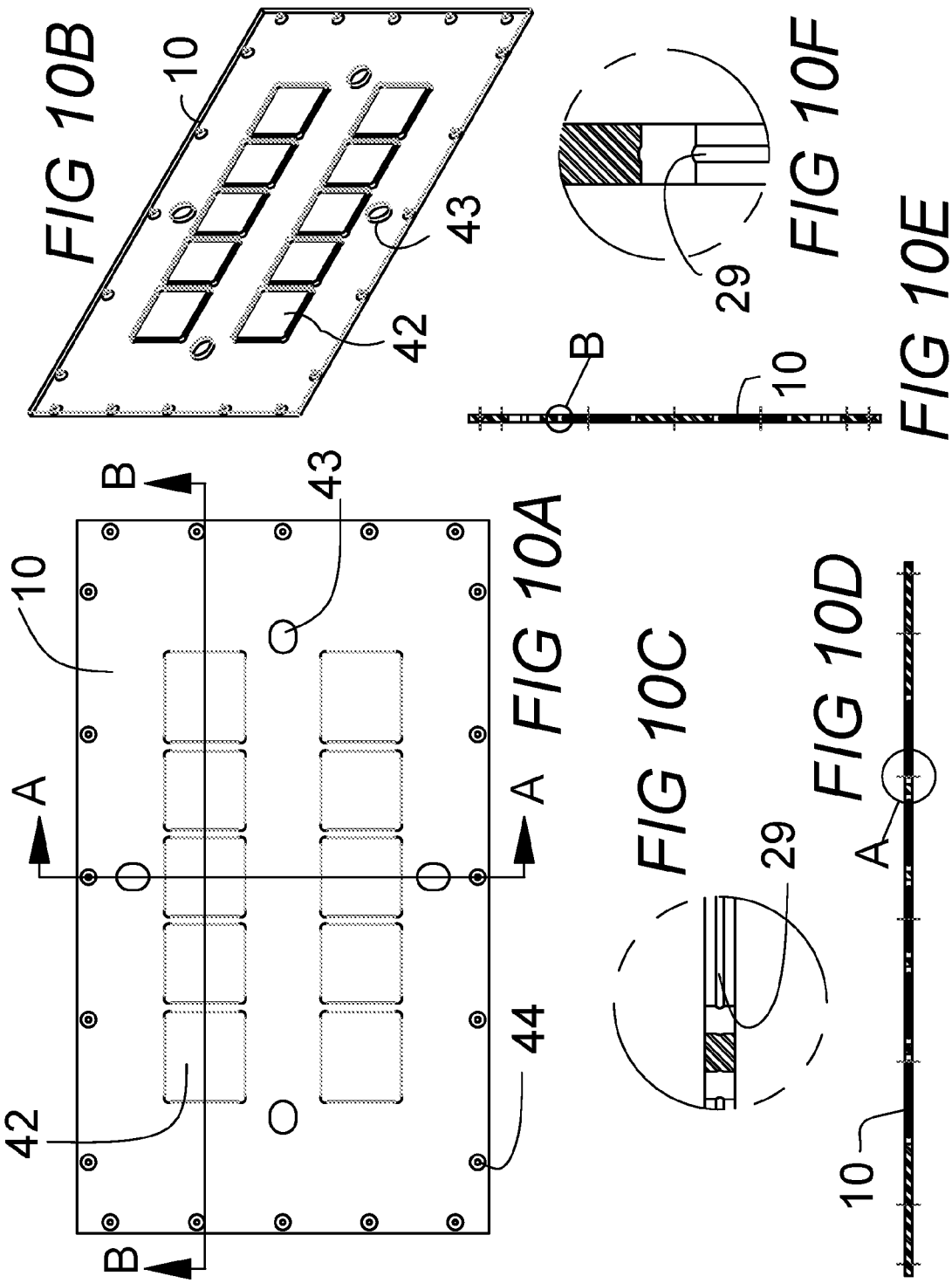

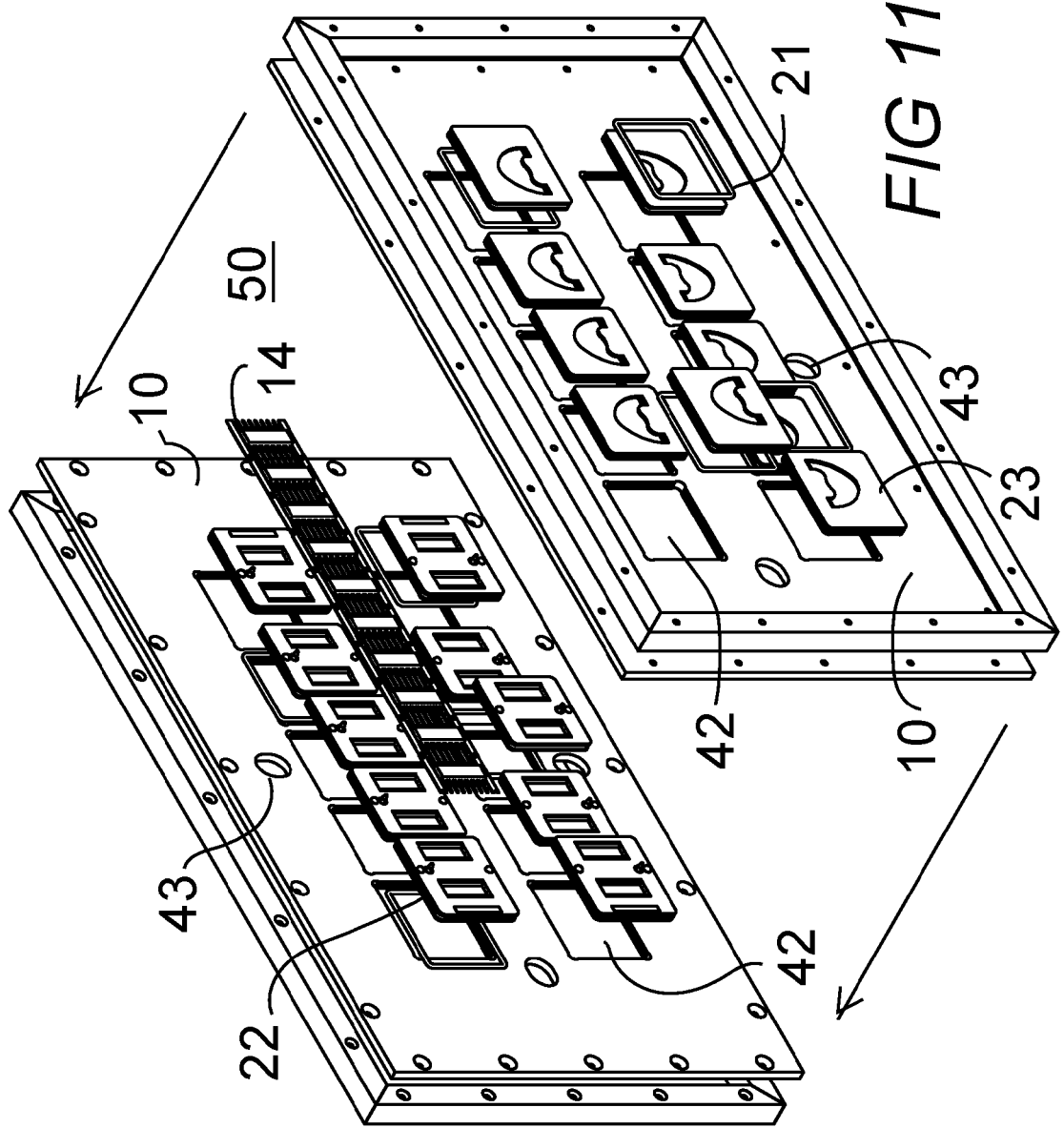

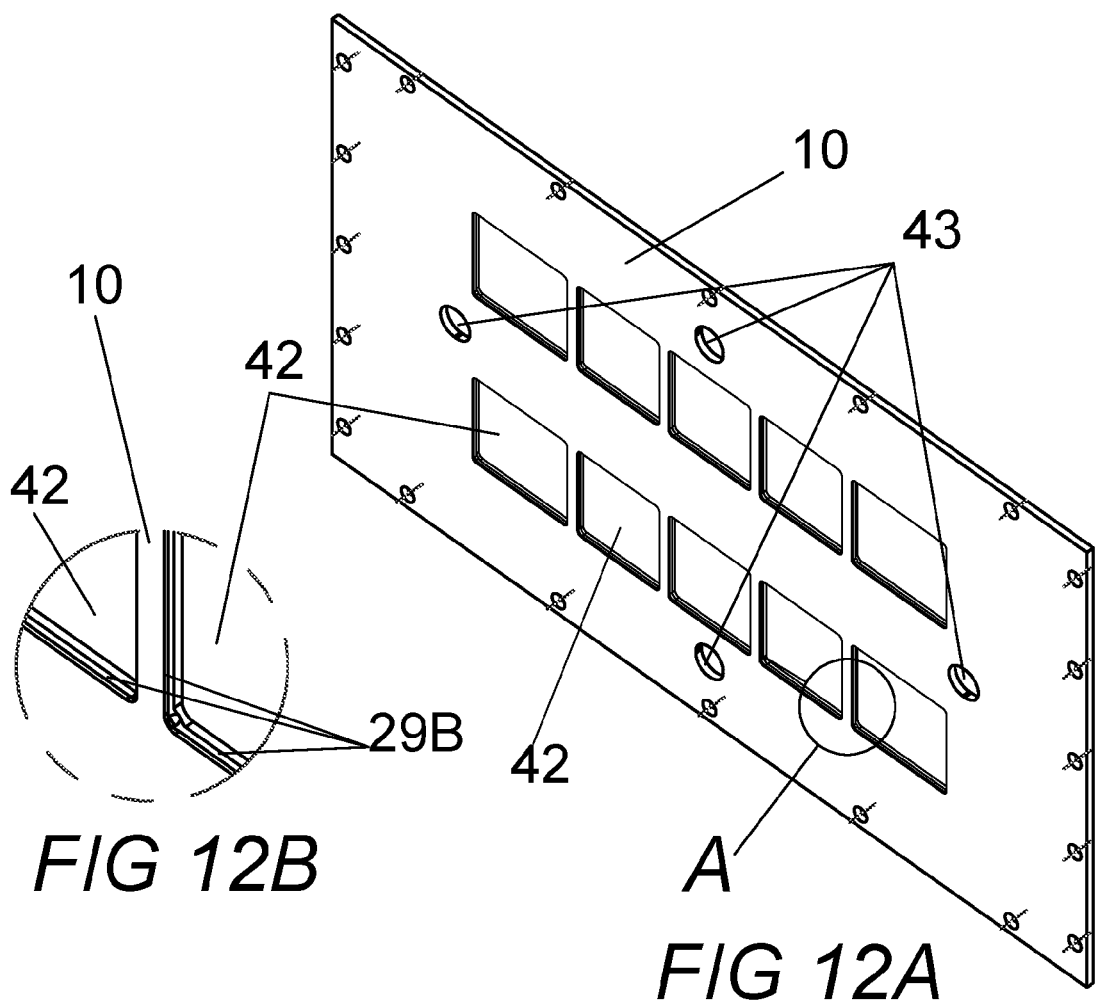

Section A-A

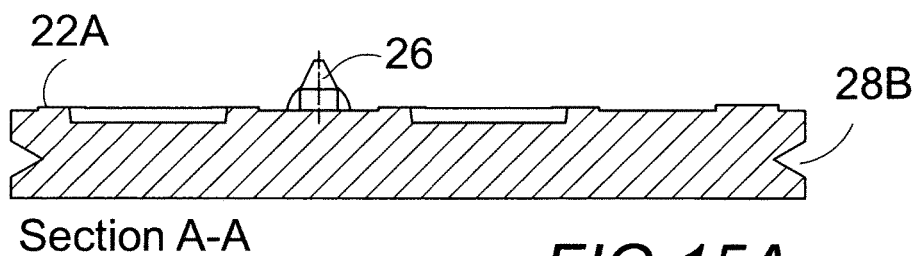
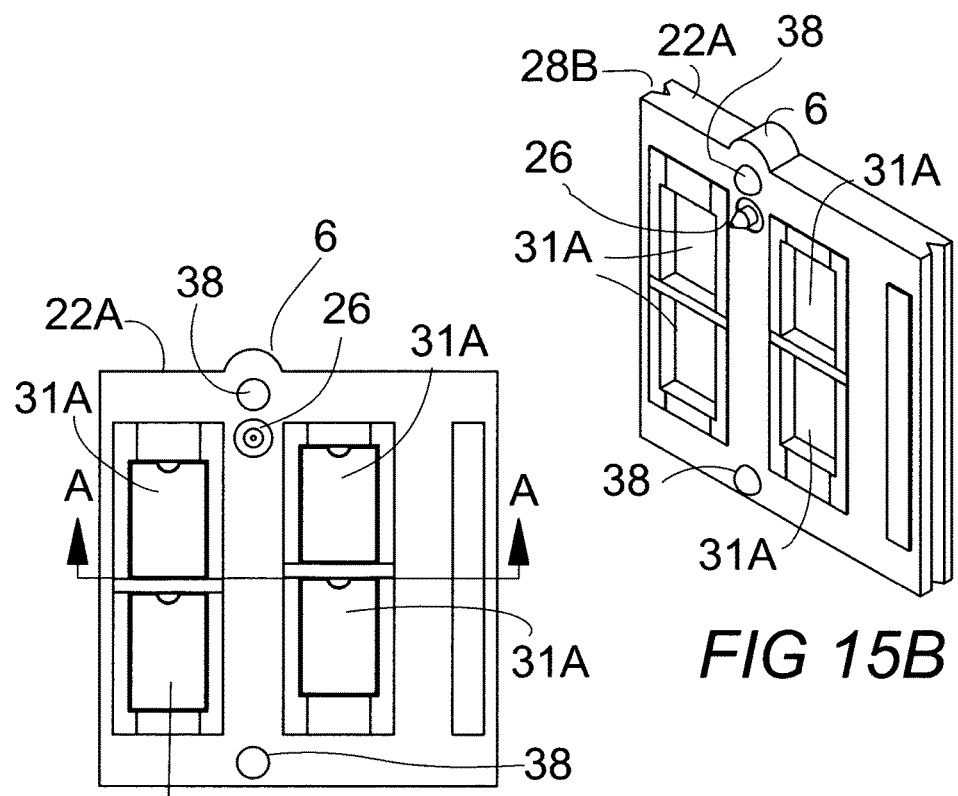

Section A-A

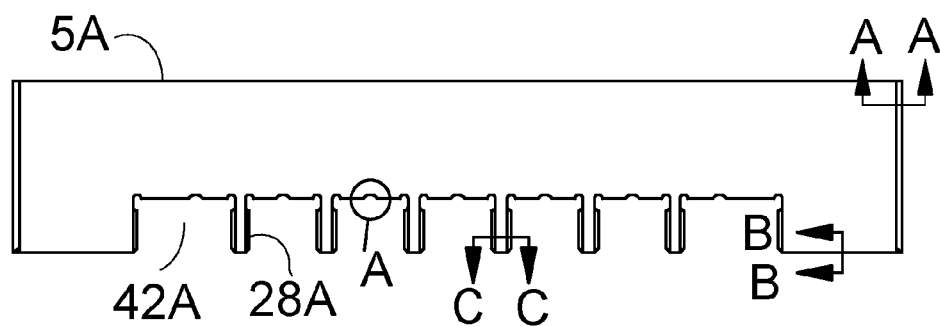
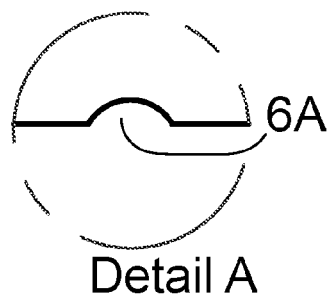
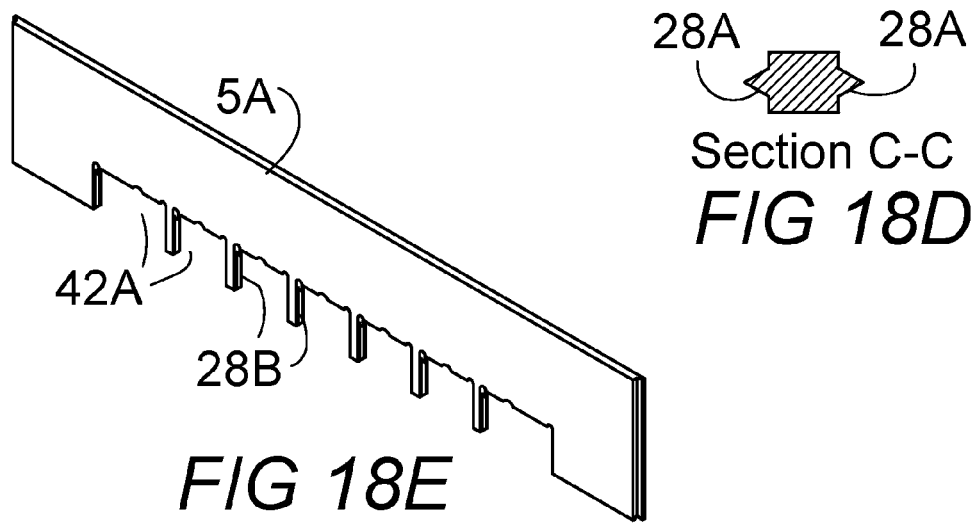

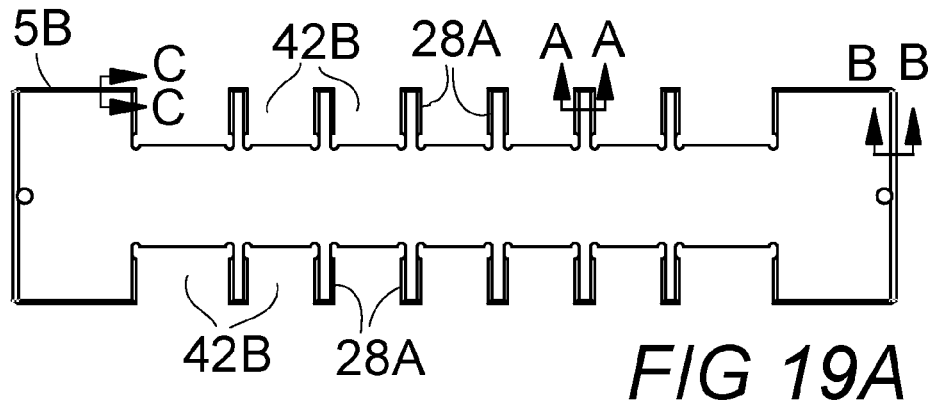
FIG 19B
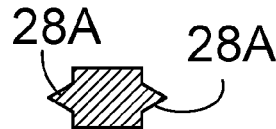
FIG 19C
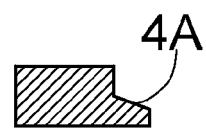
FIG 19D
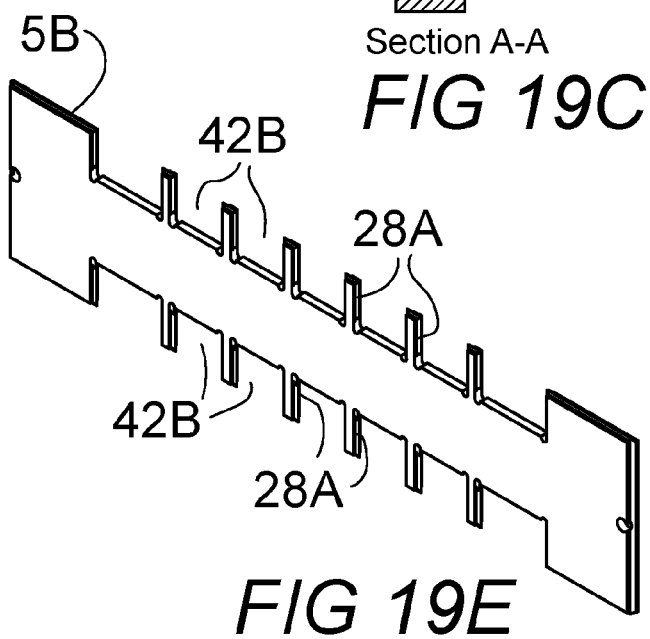
FIG 19E

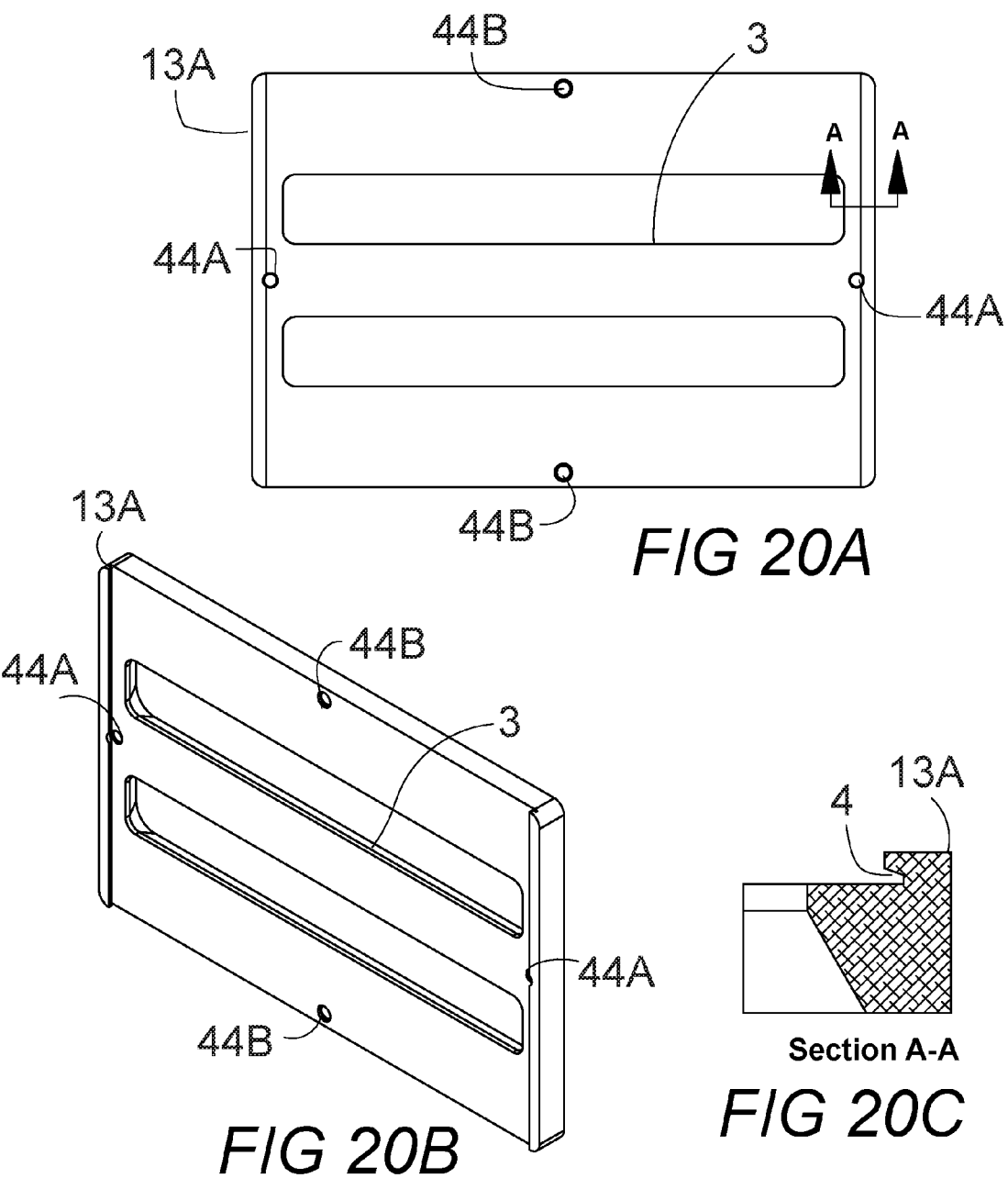

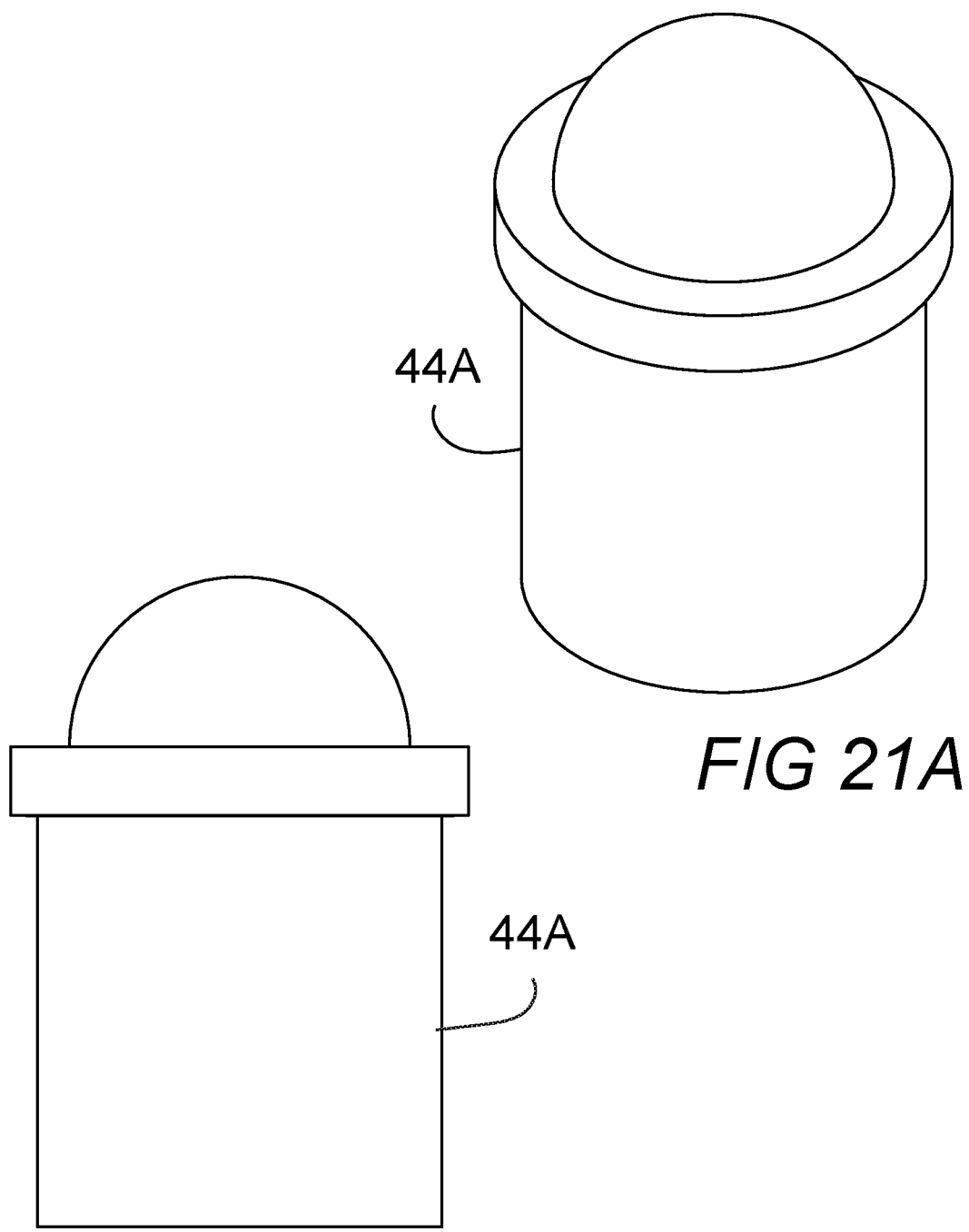

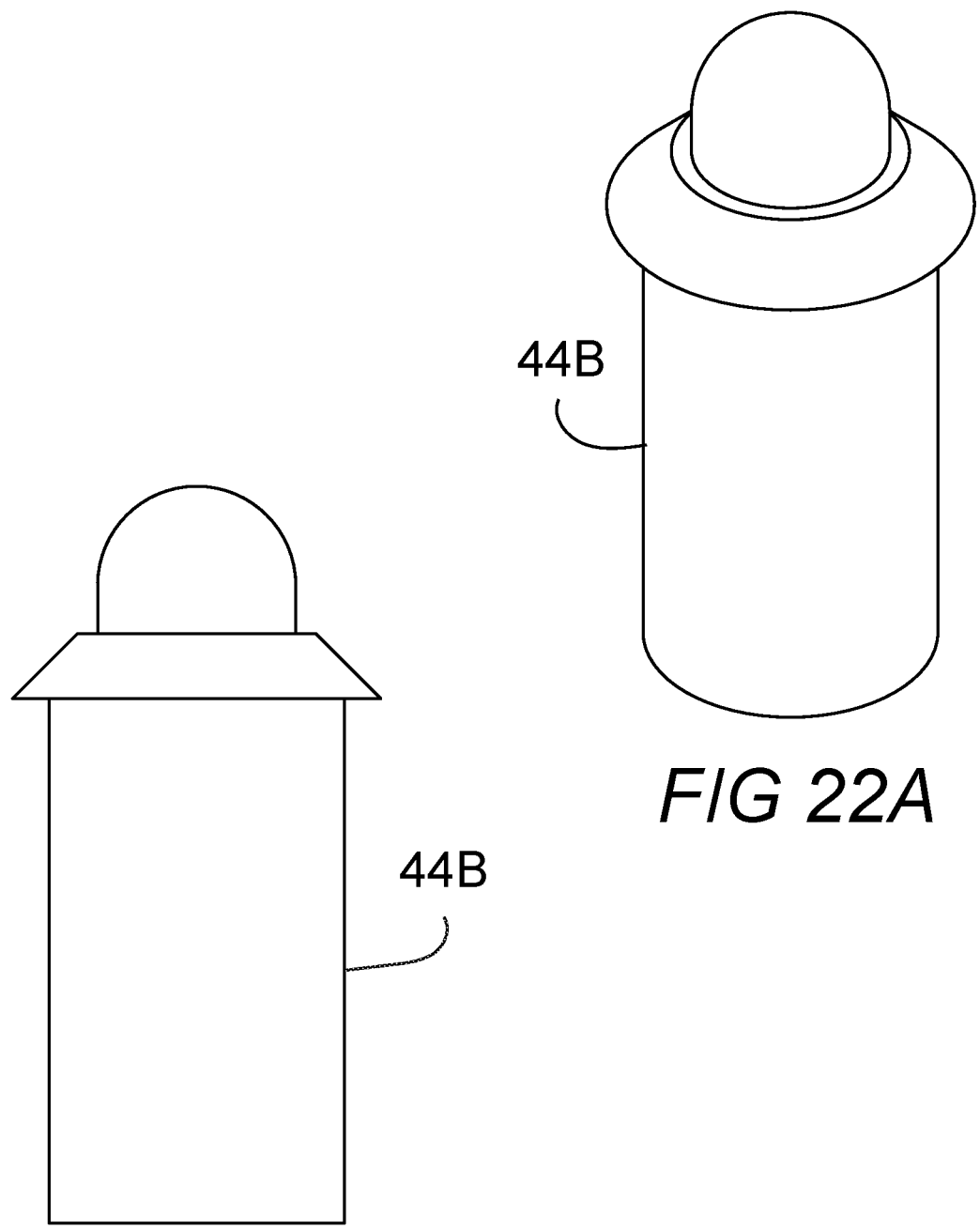

INSERTABLE APERTURE MOLDING

CROSS-REFERENCE TO RELATED APPLICATIONS

The present utility patent application is a continuation-in-part application of applicant's prior utility patent application Ser. No. 14/754,396 filed Jun. 29, 2015.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

Field of the Invention

The present invention relates to production precision molding including encapsulation of an object in plastic such as a semiconductor and in particular to an insertable aperture molding method and device utilizing replaceable pre-molded inserts inserted into one of two types of carrier plates: either inserted into a pair of multiple material removable ferrous carrier plates having mating window openings with pre-molded mating pairs of non-ferrous pre-molded inserts each having at least one mold cavity, each having a rubberized retainer ring tension fit in a continuous edge groove surrounding each pre-molded insert which is adapted to be inserted in one of the pair of mating window openings with the retainer ring snapping into a recessed edge groove surrounding the window opening to create three axis floating molds which are insertable, removable, and replaceable in the carrier plates; or utilizing replaceable pre-molded inserts inserted into at least two interlocking carrier plates having mating spaced receptacles for sliding the pre-molded inserts into the mating spaced receptacles engaging the pre-molded inserts therein by dovetail locking connections along opposing side edges of the pre-molded inserts, the at least two interlocking carrier plates interconnected and inserted in a carrier support frame all locked together to form a removable carrier plate engaged with a mating removable carrier plate to create locked-in replaceable pre-formed insert molds used in a precision production molding process which may include encapsulation molding.

Description of Related Art Including Information Disclosed Under 37 CFR 1.97-1.98

Within the field of semiconductor encapsulation there are generally two types of prior art molds. They are referred to as Conventional Molds and Plate Molds. Within both prior art molds, the plastic material is directed through long runners and intersecting gates connecting to the cavities, the material flows through these long runners, and gates filling the mold cavities and forming the package to its final shape.

The first of the prior art are Conventional Molds, which are still in use today. Although extremely expensive, it does the job well. But nevertheless there are drawbacks. They are relatively easy to damage, and extremely time consuming when cleaning after the encapsulation cycle; this is because of their design. Repairing a damaged prior art conventional mold device costs considerable time and money.

The second prior art method of encapsulation is known as Plate Molds. This design was a big step forward. Through this prior art method volume increased per encapsulation cycle in encapsulation molding, and easier cleaning was achieved. But it has drawbacks as well. Once the plate Mold design is damaged or worn-out, it cannot be repaired. It is necessary to replace it. The damaged or worn-out plate in most cases is the top plate. In both prior art designs, the gates are subjected to extreme wear. The runner system in the plate mold design is the only item that can be repaired.

Both of the prior art examples (Conventional and Plate Molds) are constructed entirely of ferrous materials which adds cost to these types of mold tools.

U.S. Pat. No. 4,513,942, issued Apr. 30, 1985 to Creasman, indicates an apparatus for encapsulating objects in molded plastic packages, in which an improved removable cavity plate assembly comprises upper and lower cavity plates which fit together in an interlocking manner to define molding cavities having integral surfaces formed within a single cavity plate on all sides of the cavity but one. The fourth side of each cavity is defined by a surface formed by the interlocking juncture between the two cavity plates. Plastic packages molded in the cavities thus are formed without a seam or parting line along the sides formed on the integral molding surfaces, the seam or parting line being formed only on the surface defined by the juncture of the two cavity plates.

U.S. Pat. No. 4,368,168 issued Jan. 11, 1983 U.S. Pat. No. 4,442,056 issued to Slepcevic, puts forth a method for encapsulating electrical components wherein a cavity plate means is removably positioned between upper and lower mold plates with the upper surface of the cavity plate means flush against the upper mold plate. The cavity plate means has openings from top to bottom thereof and holds objects spaced from the upper mold plate with the portions of the objects which are to be encapsulated being in registration with the cavity plate openings. Fluid plastic is forced laterally through feed runners formed in the surface of the upper mold plate and downwardly through gates into the cavity plate openings. After the plastic has hardened, the plastic ejected from the feed runners of the upper mold plate and the cavity plate means is removed. Preferably the objects are pre-mounted on the cavity plate means, and the lower cavity plate surface is positioned flush against the lower mold plate which is uninterruptedly flat. Alternatively, the cavity plate means holds the objects against the lower mold plate which has cavities in registration with the openings through the cavity plate means.

U.S. Pat. No. 4,442,056 issued Apr. 10, 1984 to Slepcevic, is for a molding apparatus having first and second opposed mold surfaces with the first mold surface having a feed runner network. A mold structure is supported by the second mold surface and is spaced from the first mold surface. The mold structure is adapted to hold a lead frame strip and objects held thereby in a plurality of openings. A gate plate fits between the first mold surface and the mold structure. The gate plate has a plurality of gates or apertures from a first to a second outfacing surface portion thereof. Set feed runners can be removed from the molding apparatus by motivating the gate plate laterally across the mold structure. The runners are generally removed from the gate plate by bending the gate plate over a cylindrical surface of small enough radius so that the set runners cannot follow and are forced to separate gradually from the gate plate, eventually becoming completely free and falling away from the molding apparatus.

U.S. Pat. No. 4,480,975, issued Nov. 6, 1984 to Plummer, describes an apparatus for encapsulating electronic components in plastic including a press with upper and lower press members, upper and lower flat plastic carrier plates, and transfer injection means. The plates form a closed cavity and support the electronic component.

U.S. Pat. No. 4,449,690, issued May 22, 1984 to Schroeder, is for an apparatus and a method of use thereof for cast encapsulation of items, particularly electronic components. The apparatus consists of a plurality of identically shaped split matrix elements. Each matrix element has a first surface for receiving and securing the item to be encapsulated. A second surface of another identically shaped matrix element, located on a side thereof opposite to its first surface, is then mated with the first surface securing the item. Thus mated, the first and second surfaces establish a molding cavity for enclosing the item and an orifice providing access thereto. This process of securing an item to a first surface and enclosing it with a second surface is repeated thereby assembling a stack of matrix elements. This stack is then rigidly secured and the molding cavities are filled with particulate filler material through upright orifices. Excess filler is removed by quickly turning the stack over and then righting it again. The stack of matrices is then heated, its orifices filled with a quantity of heated, liquid thermosetting encapsulating compound and exposed to vacuum whereby substantially all air is drawn from the molding cavities through the liquid encapsulating compound. The stack is then again exposed to atmospheric pressure forcing the encapsulating compound throughout the unoccupied voids in the molding cavities after which that compound is permitted to solidify, thereby completing the encapsulation process.

U.S. Pat. No. 4,560,138, issued Dec. 24, 1985 to dePuglia et al, discloses an encapsulation mold having slanted support walls which accommodate a plurality of units that are to be encapsulated, and a runner system for effectively distributing plastic to chamber adjacent the areas of the units that are to be encapsulated.

What is needed is a replaceable mold device and method of installing replaceable mating pre-molded inserts, non-ferrous molds, insertable in re-used mating ferrous carrier plates to overcome the inefficiencies of the two prior art mold types in savings of time and money.

BRIEF SUMMARY OF THE INVENTION

An object of the present invention is to provide a replaceable mold device and method of installing replaceable mating pre-molded inserts, non-ferrous molds, in re-used mating ferrous carrier plates to overcome the inefficiencies of the two prior art mold types in savings of time and money.

A related object of the present invention is to provide a mold insertion device and method of utilizing insertable, removable, replaceable non-ferrous pre-molded inserts, each having at least one mold cavity therein and each having an encircling rubberized retainer ring, providing for snapping into mating window openings in ferrous carrier plates to create three axis floating molds which are insertable, removable, and replaceable in the carrier plates for use in production precision molding including encapsulation molding of objects such as semiconductors.

One more object of the present invention is to provide an injector structure having a plunger and pot bushing structure which automatically removes the surplus injected material after each molding cycle so that with the present invention there is no need for an ejector system nor is there a need for a runner system as used in the prior art.

Another object of the present invention is to provide a insert cavity seal protruding from the flat surface portion along each of two opposing side edges of the mold cavity, the mating cavity seals comprising smooth elevated platforms maintaining the flat surface portions of the pre-molded insert faces spaced apart providing a slightly elevated a semiconductor molded package without a parting line.

A further object of the present invention is to provide a locked in system by providing insertable, removable, replaceable non-ferrous pre-molded inserts inserted into at least two interlocking carrier plates having mating spaced receptacles for sliding the pre-molded inserts into the mating spaced receptacles engaging the pre-molded inserts therein by dovetail locking connections along opposing side edges of the pre-molded inserts, the at least two interlocking carrier plates interconnected and inserted in a carrier support frame all locked together to form a removable carrier plate engaged with a mating removable carrier plate for use in production precision molding including encapsulation molding of objects such as semiconductors.

Yet one more object of the present invention is that when used in the encapsulation molding process, the semiconductor components are placed in orientation to the bottom cavities using precision projecting tapered pin locaters.

In brief, the present invention provides pre-molded replaceable inserts insertable aperture molding method and device utilizing a pair of multiple material removable ferrous carrier plates having mating window openings with pre-molded mating pairs of non-ferrous pre-molded inserts each having at least one mold cavity. A rubberized retainer ring tension fits in a continuous edge retainer ring groove surrounding each pre-molded insert, which is adapted to be inserted in one of the pair of mating window openings with the retainer ring snapping into a recessed edge retainer ring groove surrounding the window opening to create three axis floating molds which are insertable, removable, and replaceable in the carrier plates used in a precision production molding process, which may include encapsulation molding.

Alternately the replaceable pre-molded inserts of the present invention are inserted into at least two interlocking carrier plates having mating spaced receptacles for sliding the pre-molded inserts into the mating spaced receptacles engaging the pre-molded inserts therein by dovetail locking connections along opposing side edges of the pre-molded inserts, the at least two interlocking carrier plates interconnected and inserted in a carrier support frame all locked together to form a removable carrier plate engaged with a mating removable carrier plate for use in production precision molding including encapsulation molding of objects such as semiconductors.

Each mating pair of pre-molded inserts further comprise a plurality of pairs of mating alignment elements adapted for automatically lining up the pair of mating pre-molded inserts precisely during a precision molding process. The mating pre-molded inserts are fabricated of a nonferrous moldable material adapted for withstanding operating temperatures and compression pressure required for a production precision molding process.

The retainer ring groove is unique for the following reasons: one it allows for the easy insertion of anyone insert or all inserts if needed, to exchange new inserts due to wear or damage. But more importantly, through this feature, the insert is truly a removable cavity. Through retainer ring design, the inserts can move independently from each other within their own axis. Within the window the insert being retained in, gives the insert a floating cavity feature not available outside this invention. All of these features are contained within the insert.

The preformed retainer ring is made of high temperature rubber formula adapted to withstand the operating temperature of the molding process. The preformed retainer rings profile is of any shape or dimensional size to fit within the pre-molded inserts parameter. Through the retainer ring the pre-molded insert is retained within the window openings of the carrier plate to achieve flexibility within the carrier plate assembly.

Carrier plates assembled with component items in position and secured, the plate assemblies can now be transported to and from between the mold platens in the molding process.

From the face side of each of the pre-molded inserts rises what is referred to as a cavity seal or Dunbar shut off, which protrudes measurably from the surface (face side) and further, creates what is referred to as the cavity vent which resides within the edges of the cavity allowing the gases to escape into the atmosphere.

The present invention further comprises a plunger tip and mating pot bushing structure for injecting liquefied synthetic material into the pot on each top pre-molded insert. The plunger tip comprises a plunger core pin adapted for communicating with the pot bushing structure, comprising two spherical shapes one larger than the other adapted for forming a cavity for the liquefied synthetic material to occupy and solidify the synthetic material within the two spherical shapes encasing the core pin so that the tip is adapted to extract the solidified material from the pot, runner and gate of the pre-molded insert without an ejector system. The pot bushing here within has unique features; as well, it provides a stripping action through the angle and ledge that resides within the face of the bushing. The retraction of the plunger separates the solidified material from the plunger face. The contact of the angle and ledge causes a stripping action of the core pin and separation from the two spherical shapes. Thus leaving behind the separated items on the top surface of the inserts to be transported out with the encapsulated lead frame residing within the two carrier assembly. With the present invention there is no need for an ejector system nor is there a need for a runner system as used in the prior art.

An advantage of the present invention is that it provides a floating mold insertion device and method of utilizing insertable, removable, replaceable non-ferrous pre-molded inserts in ferrous carrier plates for use in production precision molding including encapsulation molding of objects such as semiconductors.

An alternate advantage of the present invention is that it provides a locked-in replaceable pre-molded inserts mold insertion device and method of utilizing insertable, removable, replaceable non-ferrous pre-molded inserts in ferrous carrier plates for use in production precision molding including encapsulation molding of objects such as semiconductors.

One additional advantage of the present invention is that protrusions from one of the faces of the pre-molded inserts engage mating indentations in the face side of the other of the pair of pre-molded inserts for precision alignment of the floating pre-molded inserts.

Another advantage of the present invention is that it overcomes the need for expensive repairs and rebuilds due to damage and wear which the prior art (Conventional Molds) are subject to.

A further advantage of the present invention is that it overcomes the second prior art (Plate Molds) disadvantage not being able to repair prior art cavity plates.

Still another advantage of the present invention is that it provides a combination of materials including ferrous material in the carrier plates for durability and strength and non-ferrous formula insertable, removable, replaceable pre-molded inserts each having at least one mold cavity.

One more advantage of the present invention is that the surplus injected material is automatically removed after each molding cycle so that with the present invention there is no need for an ejector system nor is there a need for a runner system as used in the prior art.

Still another advantage of the present invention is that it provides a semiconductor molded package without a parting line.

Yet one more advantage of the present invention is that when used in the encapsulation molding process, the semiconductor components are placed in orientation to the bottom cavities using precision locaters.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings:

FIG. 5A is a cross-sectional view of a top pre-molded insert of the present invention taken through B-B of FIG. 5B;

FIG. 5B is a bottom plan view of a top pre-molded insert of the present invention showing the face having two mold cavities;

FIG. 5C is a cross-sectional view of a top pre-molded insert of the present invention taken through A-A of FIG. 5D;

FIG. 5D is a top plan view of a top pre-molded insert of the present invention showing the pot;

FIG. 5E is an exploded cross-sectional view of Detail A of a top pre-molded insert of the present invention taken from FIG. 5 A;

FIG. 5F is an exploded cross-sectional view of Detail B of a top pre-molded insert of the present invention taken from FIG. 5 C;

FIG. 6A is an exploded cross-sectional view of a bottom pre-molded insert of the present invention taken through B-B of FIG. 6D;

FIG. 6B is an isometric view of a bottom pre-molded insert of the present invention showing the face having two mold cavities;

FIG. 6C is an edge view of a bottom pre-molded insert of the present invention showing the peripheral ring receiving groove;

FIG. 6D is a top plan view of a bottom pre-molded insert of the present invention showing the face having two mold cavities;

FIG. 6E is a cross-sectional view of the bottom pre-molded insert of the present invention taken through A-A of FIG. 6D;

FIG. 6F is an exploded partial cross-sectional view of a bottom pre-molded insert of the present invention showing Detail C of FIG. 6A;

FIG. 7A is an exploded partial cross-sectional view of a top pre-molded insert of the present invention showing Detail B of FIG. 7C;

FIG. 7B is a cross-sectional view of a mated pair of carrier plate assemblies of the present invention showing side rails and two mated pairs of pre-molded inserts;

FIG. 7C is an exploded partial cross-sectional view of a pair of mated pre-molded inserts inserted in carrier plates of the present invention showing Detail A of FIG. 7B;

FIG. 9A is a top plan view of a pair of mated pre-molded inserts of the present invention showing the top pre-molded insert and pot and portions of the semiconductor leads protruding beyond the sides of the pre-molded insert;

FIG. 9B is an orthogonal view of the pair of pre-molded inserts of the present invention showing the pot and portions of the semiconductor leads protruding beyond the sides of the pre-molded inserts;

FIG. 9C is a cross-sectional view of a pair of the mated pair of pre-molded inserts of the present invention taken through Section A-A of FIG. 9A;

FIG. 9D is an exploded cross-sectional view of the pair of mated pre-molded inserts of the present invention showing Detail B-B taken from FIG. 9C;

FIG. 10A is a plan view of a removable ferrous carrier plate of the present invention showing mating alignment holes and mating window openings;

FIG. 10B is an orthogonal view of the removable ferrous carrier plate of the present invention of FIG. 10A;

FIG. 10C is an exploded partial sectional view of the removable ferrous carrier plate of the present invention showing Detail A of FIG. 10D;

FIG. 10D is a cross-sectional view of the removable ferrous carrier plate of the present invention taken through section B-B of FIG. 10A;

FIG. 10E is a cross-sectional view of the removable ferrous carrier plate of the present invention taken through section A-A of FIG. 10A;

FIG. 10F is an exploded partial sectional view of the removable ferrous carrier plate of the present invention showing Detail B of FIG. 10E;

FIG. 11 is a perspective view of the assembly of the present invention showing the two mating carrier plates aligned for mating together and the mating top and bottom pre-molded inserts with peripheral retainer rings aligned for insertion in the mating window openings in the top and bottom carrier plates respectively, and the lead frame strip aligned for assembly with the pre-molded inserts for performing a series of semiconductor encapsulation moldings on the lead frame strip;

FIG. 12A is an orthogonal view of a removable ferrous carrier plate of the present invention showing mating alignment holes and mating window openings;

FIG. 12B is an exploded partial orthogonal view of Detail A of FIG. 12A showing the edge of the window openings having a continuous retainer ring groove around each window opening;

FIG. 15A is a cross-sectional view through section A-A of FIG. 15C showing a pre-formed left bottom insert of FIG. 13 for a bottom three-piece carrier plate showing the side dovetail connecting edges and a top locater pin to align with a top pre-formed insert in a top three-piece carrier plate;

FIG. 15B is a perspective view of the pre-formed left bottom insert of FIG. 13 showing the top mating face having the edge locater half dome for insuring proper installation of the pre-formed insert in the formed insert receptacle of the interlocking partial carrier plates, the locater pin and other domed alignment elements and the four mold cavities;

FIG. 15C is a plan view of the pre-formed left bottom insert of FIG. 13 showing the top mating face and the four mold cavities;

FIG. 18A is a plan view of an outer partial carrier plate of FIG. 13 showing the partial insert receptacles and dovetail elements along the side edges of the partial insert receptacles for engaging the mating dovetail elements on the sides of the pre-formed inserts and exploded detail A showing a half dome recess at one end of the partial insert receptacle for aligning with the edge locater half dome of the pre-formed insert for insuring proper installation of the pre-formed insert in the formed insert receptacle of the interlocking partial carrier plates;

FIG. 18B is a cross sectional view taken through section A-A of FIG. 18A showing a tapered extending lower edge to engage with a mating tapered extending upper edge of the multiple piece carrier plate support frame, shown in FIG. 20C;

FIG. 18C is a cross sectional view taken through section B-B of FIG. 18A showing a dovetail element on a forward edge of the outer partial carrier plate to engage with a mating dovetail element on a forward edge of an adjacent inner partial carrier plate to form the insert receptacles;

FIG. 18D is a cross sectional view taken through section C-C of FIG. 18A of an outer partial carrier plate of FIG. 13 showing a sliding structure between two partial insert receptacles having dovetail elements along both side edges of the partial insert receptacles for engaging the mating dovetail elements on the sides of the pre-formed inserts in adjacent partial insert receptacles;

FIG. 18E is a perspective view of an outer partial carrier plate of FIG. 13 showing the partial insert receptacles and dovetail elements along the side edges of the partial insert receptacles for engaging the mating dovetail elements on the sides of the pre-formed inserts;

FIG. 19A is a plan view of an inner partial carrier plate of FIG. 13 showing the partial insert receptacles on both sides and dovetail elements along the side edges of the partial insert receptacles for engaging the mating dovetail elements on the sides of the pre-formed inserts;

FIG. 19B is a cross sectional view taken through section C-C of FIG. 19A showing a dovetail element on a forward edge, which would also be on the opposite forward edge of the inner partial carrier plate to engage with a mating dovetail element on a forward edge of both adjacent outer partial carrier plates to form the insert receptacles therebetween;

FIG. 19C is a cross sectional view taken through section A-A of FIG. 19A of an inner partial carrier plate of FIG. 13 showing a sliding structure between two partial insert receptacles having dovetail elements along both side edges of the partial insert receptacles for engaging the mating dovetail elements on the sides of the pre-formed inserts in adjacent partial insert receptacles;

FIG. 19D is a cross sectional view taken through section B-B of FIG. 19A showing a tapered extending lower edge to engage with a mating tapered extending upper edge of the multiple piece carrier plate support frame, shown in FIG. 20C;

FIG. 19E is a perspective view of the inner partial carrier plate of FIGS. 13 and 19A showing the partial insert receptacles on both sides of the inner partial carrier plate and the dovetail elements along the both edges of the partial insert receptacles for engaging the mating dovetail elements on the sides of the pre-formed inserts;

FIG. 20A is a plan view of the carrier plate frame of FIG. 13 to retain the interlocked multiple partial carrier plates forming a single three piece carrier plate showing the plunger cone spring detainers on opposite side edges of the frame and the plunger cone spring lockers on opposite ends of the frame to lock in the partial carrier plates, and showing an optional support panel across the center of the frame;

FIG. 20B is a perspective view of the carrier plate frame of FIG. 13 and FIG. 20A;

FIG. 20C is a cross sectional view taken through section A-A of FIG. 20A showing a tapered extending upper edge along the end retaining edges of the frame to engage with retain a mating tapered extending lower edge of the side edges of the partial carrier plates, shown in FIGS. 18B and 19D;

FIG. 21A is a perspective view of one of the plunger cone spring detainers on opposite side edges of the frame of FIGS. 13 and 20A;

FIG. 21B is an elevational view of one of the plunger cone spring detainers of FIG. 21A as used on opposite side edges of the frame of FIGS. 13 and 20A;

FIG. 22A is a perspective view of one of the plunger cone spring lockers on opposite side retaining ends of the frame of FIGS. 13 and 20A;

FIG. 22B is an elevational view of one of the plunger cone spring lockers of FIG. 22A as used on opposite side retaining ends of the frame of FIGS. 13 and 20A.

DETAILED DESCRIPTION OF THE INVENTION

Figure 13:
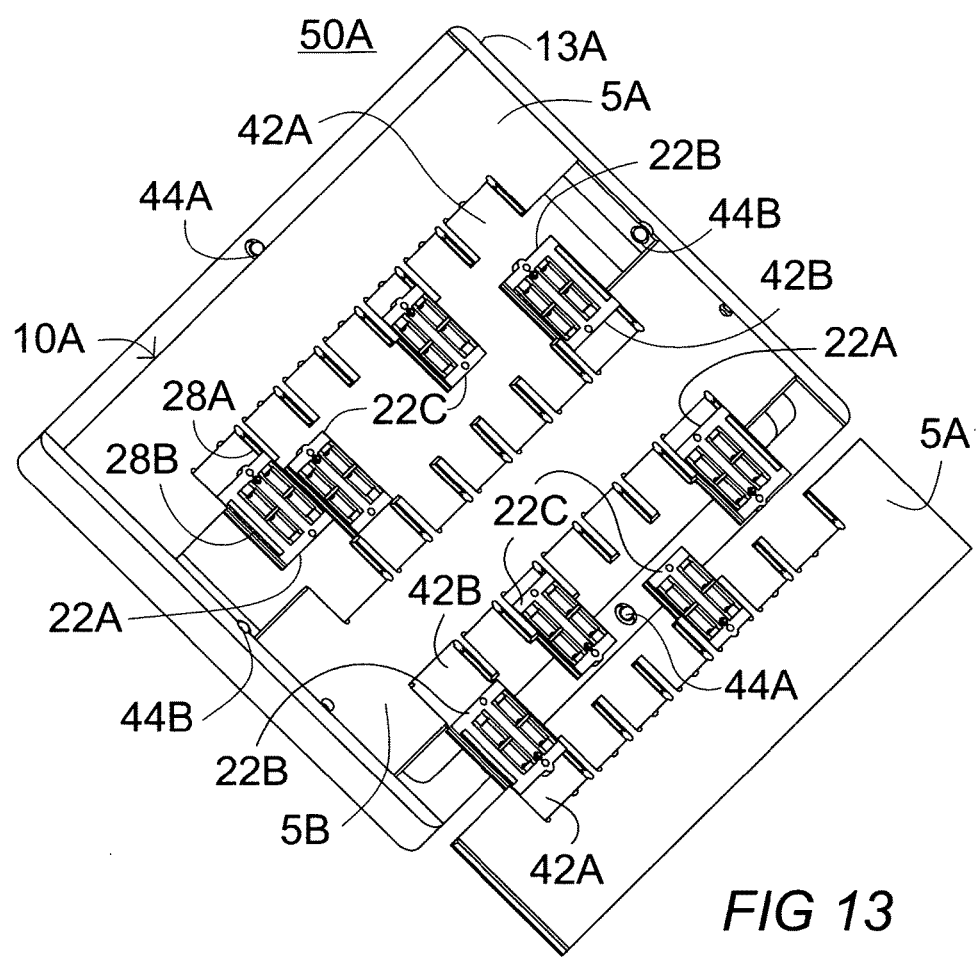
FIG. 13 is an exploded assembly view of an alternate embodiment of the present invention showing three partial carrier plates aligned for interlocking together while receiving the pre-formed inserts sliding into mating halves of insert receptacles utilizing dovetail connections between the inserts and the partial carrier plates to form a single interlocked carrier plate retained within a three piece carrier plate support frame.
Figure 14A:
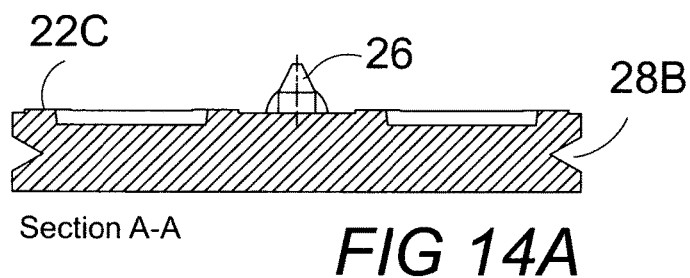
FIG. 14A is a cross-sectional view taken through section A-A of FIG. 14C showing a pre-formed center bottom insert of FIG. 13 for a bottom three-piece carrier plate showing the side dovetail connecting edges and a top locater pin to align with a top pre-formed insert in a top three-piece carrier plate.
Figure 14B:
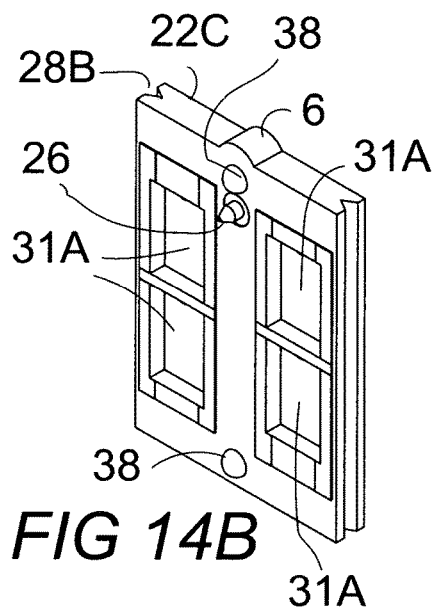
FIG. 14B is a perspective view of the pre-formed center bottom insert of FIG. 13 showing the top mating face having the edge locater half dome for insuring proper installation of the pre-formed insert in the formed insert receptacle of the interlocking partial carrier plates, the locater pin and other domed alignment elements and the four mold cavities.
Figure 14C:
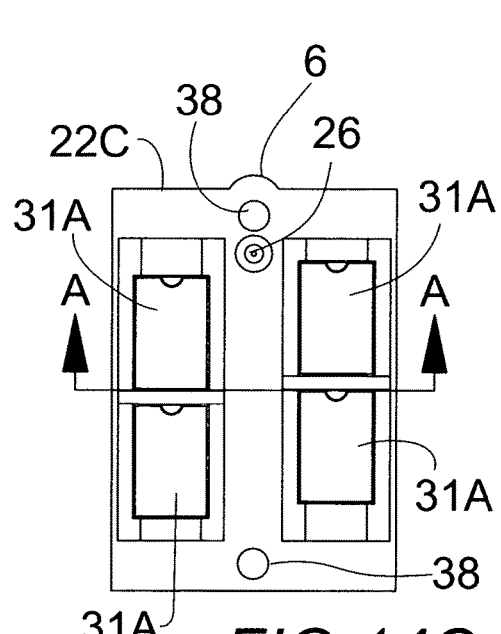
FIG. 14C is a plan view of the pre-formed center bottom insert of FIG. 13 showing the top mating face and the four mold cavities.
Figure 16A:
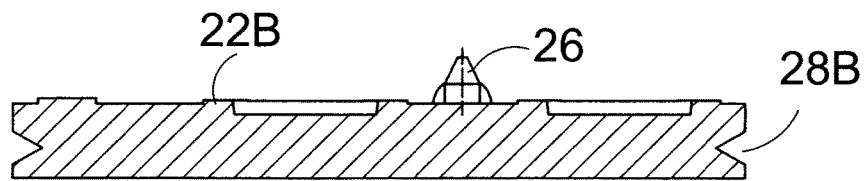
FIG. 16A is a cross-sectional view through section A-A of FIG. 16C showing a pre-formed right bottom insert of FIG. 13 for a bottom three-piece carrier plate showing the side dovetail connecting edges and a top locater pin to align with a top pre-formed insert in a top three-piece carrier plate.
Figure 16B:
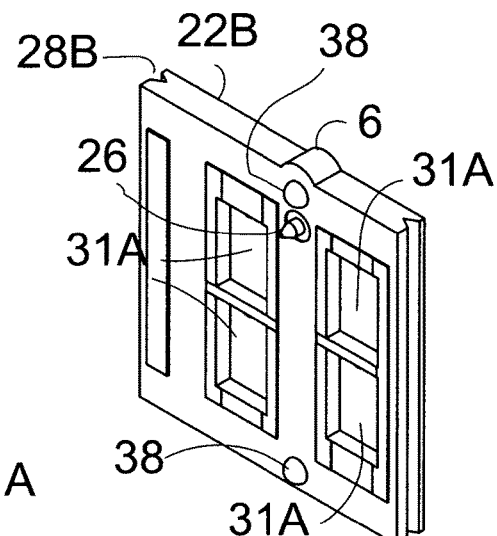
FIG. 16B is a perspective view of the pre-formed right bottom insert of FIG. 13 showing the top mating face having the edge locater half dome for insuring proper installation of the pre-formed insert in the formed insert receptacle of the interlocking partial carrier plates, the locater pin and other domed alignment elements and the four mold cavities.
Figure 16C:
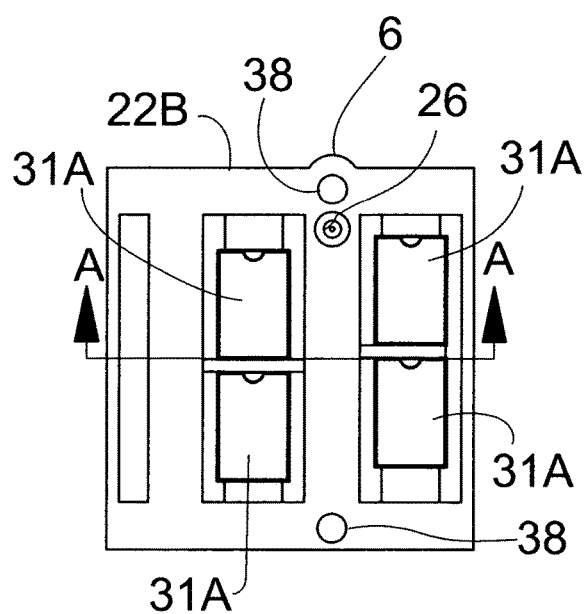
FIG. 16C is a plan view of the pre-formed right bottom insert of FIG. 13 showing the top mating face and the four mold cavities.

In FIGS. 1-22, the present invention comprises a multiple material carrier plate assembly 50 and 50A, as shown in FIGS. 11 and 13 with mating pairs of insertable, removable, replaceable non-ferrous pre-molded inserts 22 and 23, 22A and 23A, 22B and 23B, 22C and 23C, each having at least one mold cavity 31, inserted into two removable carrier plates 10 and 10A for use in precision molding.

Mating pairs of insertable, removable, replaceable non-ferrous pre-molded inserts 22 and 23, 22A and 23A, 22B and 23B, 22C and 23C each have at least one mold cavity 31. Each of the pre-molded inserts comprising outer edge configurations 29A and 28B adapted for aligning with and engaging a mating insert receptacle 42, 42A and 42B in a removable carrier plate 10 and 10A for use in precision molding. Each of the pre-molded inserts removably inserted in each of the mating insert receptacles 42, 42A and 42B in a floating fit configuration allowing each of the pre-molded inserts to float in all three axis within the insert receptacle allowing for self-aligning between the at least one mating pair of pre-molded inserts in the pair of removable carrier plates 10 and 10A.

Figure 1:
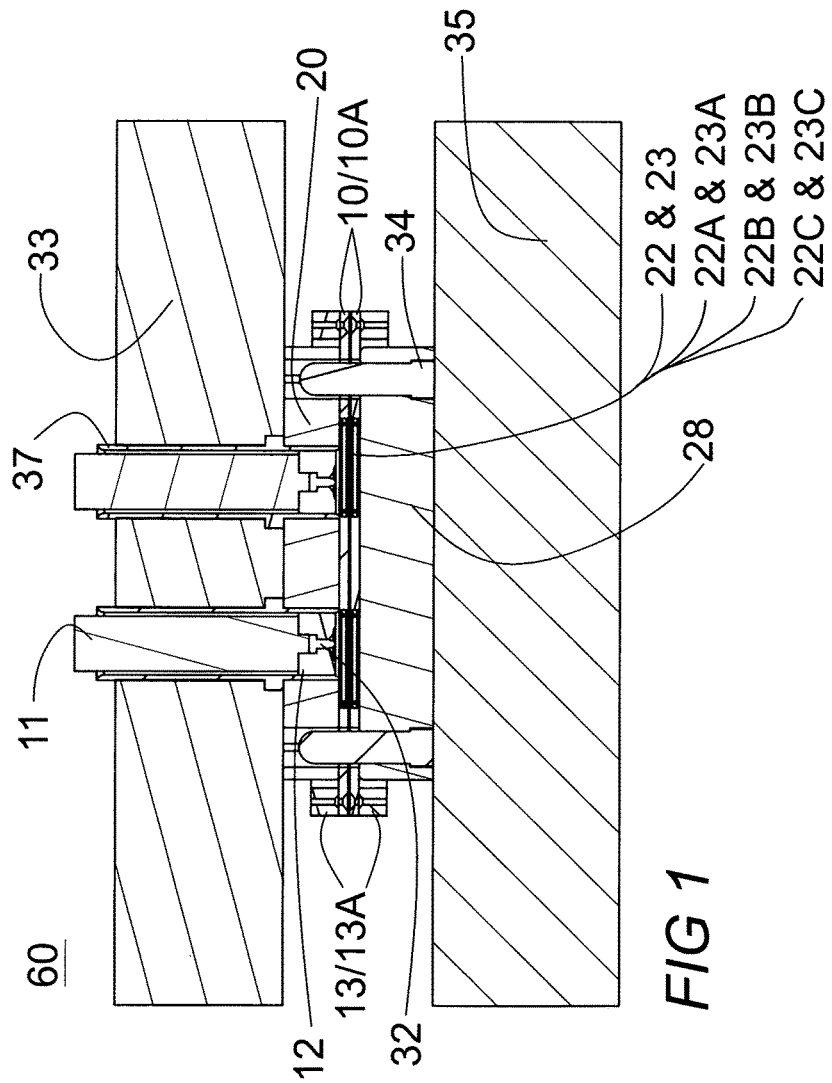
FIG. 1 is a cross-sectional elevation view of the floating mold assembly of the present invention showing the assembled components mounted on an encapsulation molding apparatus for use in a molding process.

The pairs of mating pre-molded inserts 22 and 23, 22A and 23A, 22B and 23B, 22C and 23C further comprise a plurality of pairs of mating alignment elements 6, 26, 38 adapted for automatically lining up with the pair of mating pre-molded inserts precisely during a precision molding process, the at least one pair of mating pre-molded inserts fabricated of a nonferrous moldable material adapted for withstanding operating temperatures and compression pressure required for a production precision molding process;

The mating pair of removable carrier plates 10 and 10A each comprise a plurality of precision mating elements 43 arranged in a given pattern and position for precision alignment of the mating pair of carrier plates, the carrier plates fabricated of a ferrous material adapted for long-term use in a production precision molding apparatus;

In a one-piece carrier plate embodiment of FIGS. 1, 5, 6, and 9, mating pairs of three axis floating replaceable non-ferrous pre-molded inserts 22 and 23, each have at least one mating cavity mold 31 and having a surrounding continuous retainer ring grooves 29A and an attached retainer rings 21 tension-fit in each of the grooves. removably snap-fit into peripherally grooved insert receptacle windows 42 in one-piece removable carrier plates 10 for use in precision molding, as shown in FIG. 1 with the carrier plate assembly 50 installed in a production precision molding apparatus, such as an encapsulation molding apparatus 60, as shown in FIG. 1.

The assembly comprises a mating pair of removable carrier plates 10, as shown in FIGS. 1, 10, 11, and 12, adapted to be installed in a precision molding device 60, each of the of the carrier plates having a mating matrix of elongated precision openings 43 arranged in a given pattern and precision position for precision alignment of the mating pair of carrier plates 10. The carrier plates 10 have at least one pair of insert receptacles or window openings 42 with one of the insert receptacles in each of the mating carrier plates, adapted for aligning with the other mating insert receptacle when the carrier plates 10 are moved together in a molding process. The carrier plates are preferably fabricated of a ferrous material adapted for long-term use in a production precision molding machine.

In FIG. 12 in the detail A, each of the window openings 42 has a continuous recessed insert retainer ring groove 29B in an interior edge of the window opening around the entire window opening.

The assembly further comprises at least one pair of replaceable pre-molded inserts 22 and 23, as shown in FIGS. 5-7 and 9, each having at least one mold cavity 31. Each pre-molded insert is adapted to be inserted in one of the pair of mating window openings 42 to secure each of the pre-molded inserts in one of the mating window openings of the carrier plate 10. Each of the pre-molded inserts 22 and 23 has a continuous insert retainer ring groove 29A around an entire outside perimeter edge and each of the pre-molded inserts has at least one mold cavity 31 recessed in a face 8 and 9 of the pre-molded insert 22 and 23. The mating pair of pre-molded inserts 22 and 23 further comprise a plurality of pairs of mating alignment elements, such as a convex protruding hemisphere 38 or dome mating with a concave recessed hemisphere 39, as shown in FIGS. 5, 6, and 9, adapted for automatically lining up the pair of mating pre-molded inserts 22 and 23 precisely during a precision molding process. The mating pre-molded inserts are preferably fabricated of a nonferrous moldable material adapted for withstanding operating temperatures and compression pressure required for a production precision molding process.

The assembly further comprises a resilient rubber-like preformed retainer ring 21 stretched around each of the pre-molded inserts perimeter edge and each tension fit into the continuous retainer ring groove 29A encircling the perimeter edge with a portion of the retainer ring extending outside of the perimeter edge of the pre-molded insert. Each pre-molded insert 22 and 23 with the tension fit retainer ring is adapted to be inserted into one of the window openings 42 with the retainer ring 21 snapping into the window recessed retainer ring groove 29B around the window opening. The pre-molded insert 22 and 23 is adapted to be insertable, removable and replaceable. The retainer ring 21 has a resilience sufficient to allow motion of the insert in an X axis, Y axis and Z axis thereby forming a three-axis floating mold. The mating pre-molded inserts 22 and 23 are adapted to be moved together into a mating position in a precision molding process. The retainer ring 21 is preferably fabricated of a nonferrous rubberlike material adapted for withstanding the operating temperatures required for production precision molding.

The carrier plates preferably comprise a plurality of pairs of mating window openings 42 of any given shape or desired quantity thereof in any mating location in the removable carrier plates 10 to suit the needs of the precision production molding process.

Figure 2:
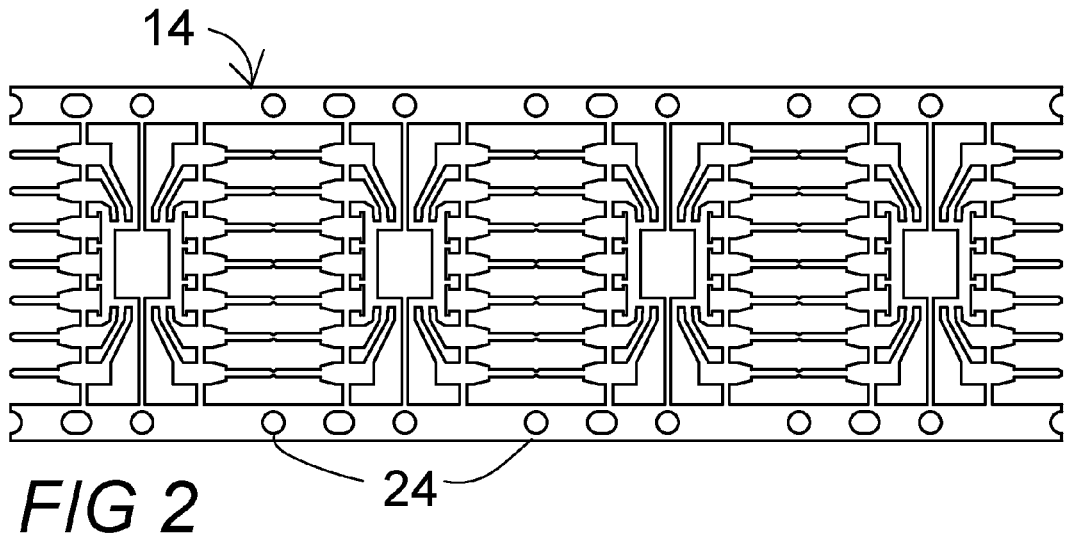
FIG. 2 is a top plan view of a portion of a typical lead frame strip, unmolded, showing only four of the ten positions in a standard frame.
Figure 3:
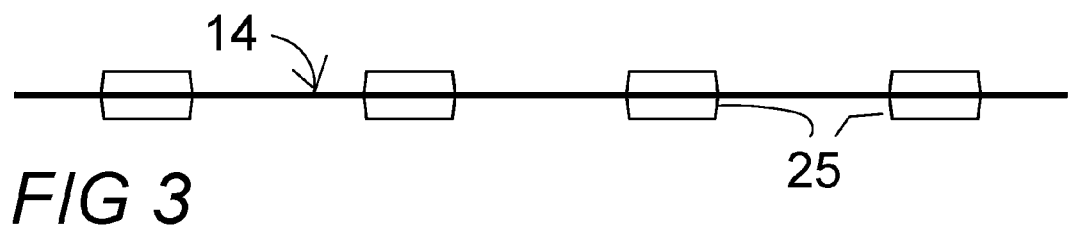
FIG. 3 is a side elevation view of the lead frame strip of FIG. 2 showing the end profile of the semiconductor encapsulated mold, the portions above and below the metal lead frame.
Figure 4:
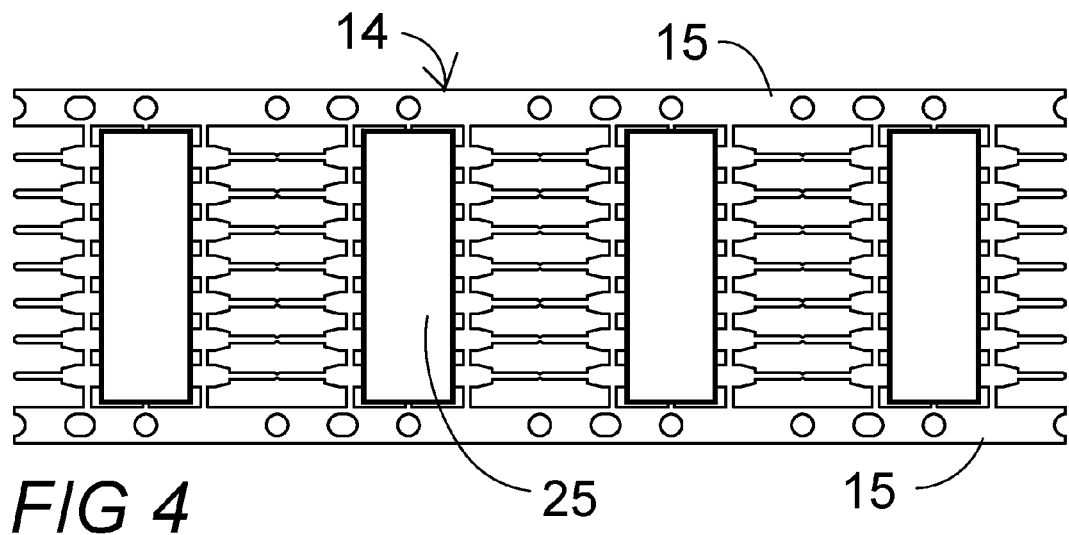
FIG. 4 is a top plan view of the lead frame strip of FIG. 2 showing the semiconductor encapsulated mold in a rectangular shape after encapsulation.
Figure 8A:
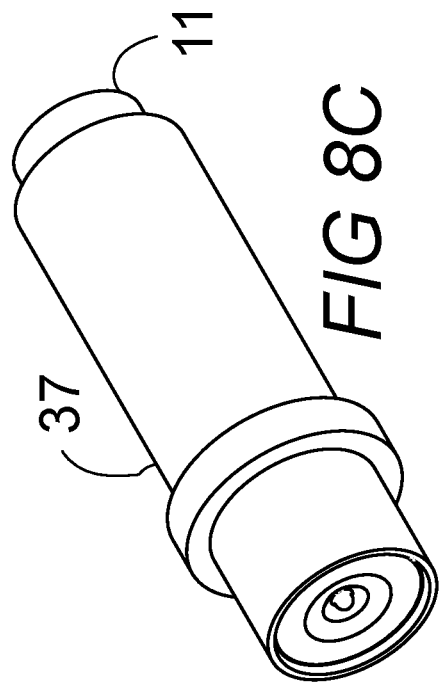
FIG. 8A is an elevational view of a plunger rod in a pot bushing of the present invention.
Figure 8B:
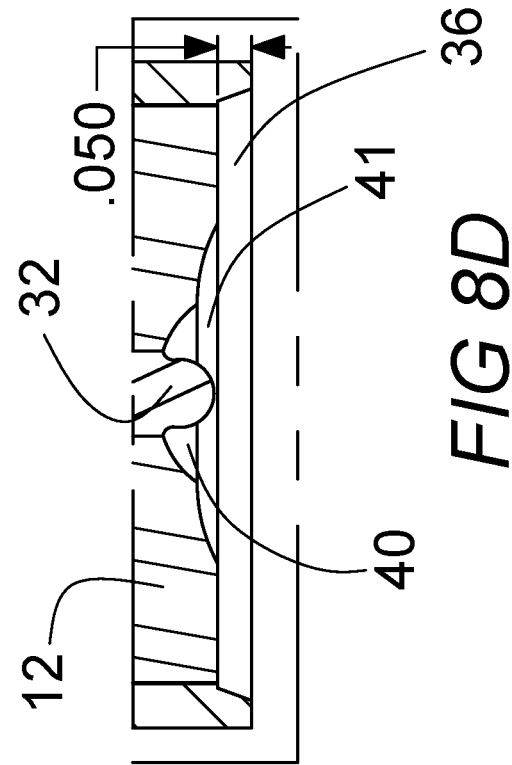
FIG. 8B is a cross-sectional view of the plunger assembly in the pot bushing of the present invention taken through A-A of FIG. 8A.
Figure 8C:
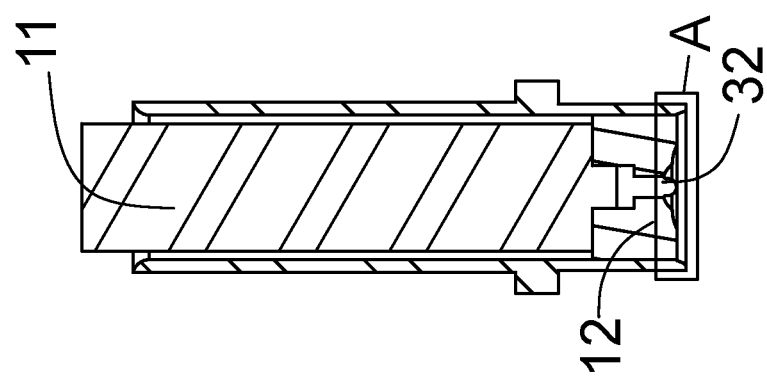
FIG. 8C is an orthogonal view of the plunger assembly in the pot bushing of the present.
Figure 8D:
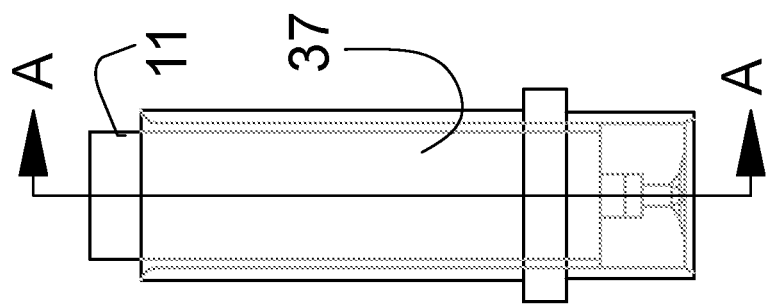
FIG. 8D is an exploded cross-sectional view of the plunger tip of the present invention showing Detail A of FIG. 8B.

In FIGS. 1, 5-7, and 9-12, the pairs of mating window openings 42 and the paired floating insert molds 22 and 23 are configured for an encapsulation molding process and the assembly further comprises a lead frame 14, as shown in detail in FIGS. 2-4, installed between the pairs of mating pre-molded inserts 22 and 23 with the multi-material assembly removable carrier plates 10 installed in a production precision molding apparatus to produce encapsulated semiconductor components 25, as shown in FIG. 3.

In an alternate multiple piece carrier plate 10A embodiment of FIGS. 13, 17A, 17B and 17D, mating pairs of three axis floating replaceable non-ferrous pre-molded inserts 22A and 23A, 22B and 23B, 22C and 23C, each having dovetail connectors 28B along opposing exterior side edges of the pre-molded inserts adapted to engage mating dovetail connectors 28A along opposing interior side edges of each of the mating pair of partial insert receptacles 42A and 42B in a sliding engagement during the interconnecting of the partial carrier plates removably attached to pairs of removable carrier plates 10A for use in precision molding, as shown in FIG. 1 with the carrier plate assembly 50A installed in a production precision molding apparatus, such as an encapsulation molding apparatus 60, as shown in FIG. 1.

The mating pair of carrier plates 10 and 10A comprises a top carrier plate positioned horizontally above and parallel to a mating bottom carrier plate in a production precision molding apparatus 60, as shown in FIG. 1. At least one top pre-molded insert 23, 23A, 23B, 23C is adapted to be inserted in an insert receptacle 42, 42A and 43B of the top carrier plate 10 or 10A. The top pre-molded insert 23, 23A, 23B, 23C comprises a top pre-molded insert face 9 facing downwardly for interfacing with a mating bottom pre-molded insert face 8 facing upwardly in the bottom mating carrier plate 22, 22A, 22B, 22C. The mating insert faces 8 and 9 each comprise a flat surface portion having a plurality of mating alignment elements 26, 38, 39, 40, adapted for automatic precision alignment of the mating pair of pre-molded inserts 22 and 23, 22A and 23A, 22B and 23B, 22C and 23C.

Each mating insert face 8 and 9 has a mating mold cavity 31 as shown in FIGS. 5B and 6B, or mating mold cavity 31A as shown in FIGS. 14B, 14C, 15B, 15C, 16B, 16C, and 17C, recessed in the flat surface portion communicating with the other mold cavity 31 or 31A on the other mating face. Each mating face 8 and 9 further comprises an insert cavity seal 27 protruding from the flat surface portion along each of two opposing side edges of the mold cavity 31 or 31A. The mating cavity seals 27 comprise smooth elevated platforms maintaining the flat surface portions of the pre-molded insert faces spaced apart, thereby forming cavity vents 45 along the adjacent other two opposing side edges of the mold cavity, as shown in FIGS. 5 and 6, allowing gases from the mold cavities to escape into the atmosphere. The top pre-molded insert 23 further comprises a top surface opposite the bottom facing face, the top surface having a recessed area comprising a pot 17 or Cull connected by at least one runner and at least one cavity gate 19 communicating with top and bottom mold cavities 31 or 31A for injecting liquefied synthetic material therein during a production precision molding process.

The plurality of mating alignment elements adapted for automatic precision alignment of the mating pair of pre-molded inserts may comprise at least one hemispheric protruding dome 38 from the bottom insert 22, 22A, 22B, 22C face adapted to automatically insert in a mating hemispherical recess 39 in the top insert 23, 23A, 23B, 23C face, as shown in FIGS. 5, 6, 9, 17A and 17B.

Figure 17A:
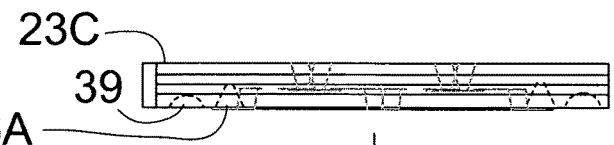
FIG. 17A is a cross-sectional view through section A-A of FIG. 17C showing a pre-formed center bottom insert and pre-formed center top insert aligned for interfacing.
Figure 17B:
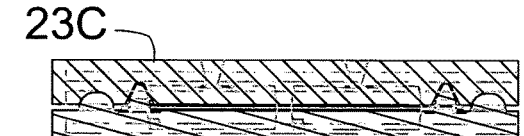
FIG. 17B is a cross-sectional view taken through section A-A of FIG. 17C showing a pre-formed center bottom insert and pre-formed center top insert interfacing for performing a precision molding process.
Figure 17C:
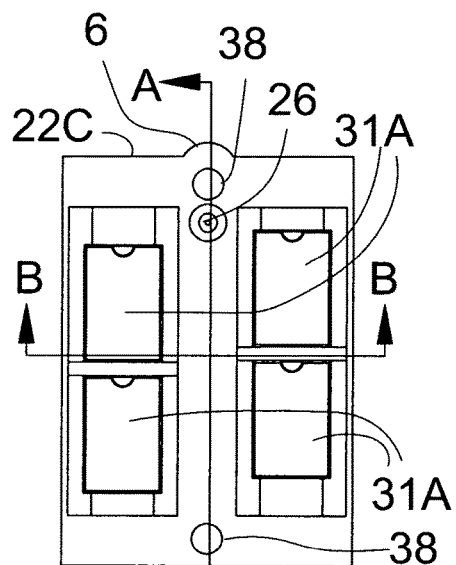
FIG. 17C is a plan view of the pre-formed center bottom insert of FIG. 13 showing the top mating face having the edge alignment half dome for aligning with the formed insert receptacle of the interlocking partial carrier plates, the locater pin and other domed alignment elements and the four mold cavities.
Figure 17D:
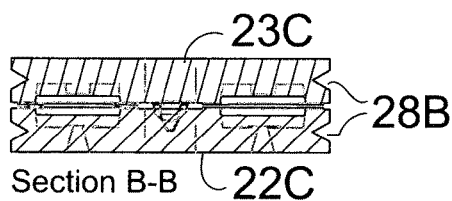
FIG. 17D is a cross-sectional view taken through section B-B of FIG. 17C showing the pre-formed center bottom insert and pre-formed center top insert interfacing for performing a precision molding process.

At least one locater pin 26 from the bottom pre-molded insert 22, 22A, 22B and 22C face, as shown in FIGS. 6, 17A and 17B extends perpendicularly upward to a tapering point to protrude through an alignment hole 24 and 26A of an external inserted lead frame 14, as shown in FIGS. 2 and 4, to engage the lead frame and secure it in a precise position relative to the bottom pre-molded insert 22, the locator pin 26 further adapted to extend into a mating conical shaped recess 16 and 6A in the mating top pre-molded insert 23, 23A, 23B, 23C face for precision alignment of the bottom pre-molded insert 22, 22A, 22B, 22C with the lead frame 14.

The assembly further comprises a plunger rod 11 in a pot bushing 37 for each mating pair of mating pre-formed inserts 22 and 23, 22A and 23A, 22B and 23B, 22C and 23C for transmitting liquefied synthetic material to the mating mold cavities 31. The plunger comprises a plunger tip 12 at a lower end of the plunger rod for injecting the liquefied synthetic material into the assembly. A mating pot bushing structure for receiving the liquefied synthetic material for transmitting the liquefied synthetic material to the pot 17 on each top pre-molded insert 23, the plunger tip comprising a plunger core pin 32 adapted for communicating with the pot bushing structure. The plunger tip further comprises two spherical shapes 40 and 41 one larger than the other adapted for forming a cavity for the liquefied synthetic material to occupy and solidify, the synthetic material within the two spherical shapes encasing the core pin so that the tip is adapted to extract the solidified material from the pot, the runner, and the gate of the pre-molded insert without an ejector system. The pot bushing further comprising a pot bushing stripping angle and ledge 36 within a face of the bushing adapted for a stripping action of the core pin and separation from the two spherical shapes so that retraction of the plunger separates the solidified material from the plunger face.

In use, a multiple material one-piece carrier plate assembly 50 molding method using mating pairs of three axis floating replaceable pre-molded inserts 22 and 23 attached to window openings 42 in pairs of removable carrier plates 10, each pre-molded insert having at least one mold cavity 31, the method comprises:

a first step of fabricating at least one pair of removable carrier plates 10 of a ferrous material adapted for long-term use in a production precision molding machine, each of the pair of carrier plates having a mating matrix of elongated precision openings 43 arranged in a given pattern and precision position for precision alignment of the mating pair of carrier plates, the at least one pair of carrier plates having at least one pair of mating window openings 42, having one of the mating pair of window openings in each carrier plate, the pair of mating window openings mutually aligning when the carrier plates are moved together in a molding process, each of the window openings having a continuous recessed groove 29B in an interior edge of the window opening around the entire window opening;

a second step of pre-molding at least one pair of replaceable mating pre-molded inserts 22 and 23 having mating mold cavities 31, each of the pre-molded inserts having a continuous edge groove 29A around an entire perimeter of each of the pre-molded inserts, each of the mating pair of pre-molded inserts further comprising a plurality of pairs of mating alignment elements for automatically lining up the mating pre-molded inserts precisely during the mating of the at least one pair of pre-molded inserts in the molding process, the mating pre-molded inserts fabricated of a nonferrous pre-molded material adapted for withstanding operating temperatures and compression pressure required for a production precision molding process;

a third step of installing a resilient rubber-like preformed retainer ring 21 around each of the pre-molded inserts 22 and 23 by stretching the retainer ring around the perimeter of the pre-molded insert and allowing the retainer ring to snap with a tension fit into the continuous groove 29A encircling the pre-molded insert with a portion of the retainer ring extending outside of the perimeter edge of the pre-molded insert, pre-molded insert being insertable, removable and replaceable, the retainer ring fabricated of a nonferrous rubberlike material adapted for withstanding operating temperatures required for a production precision molding process;

a fourth step of snapping at least one pair of pre-molded inserts 22 and 23 into a mating pair of window openings 42 in the pair of mating carrier plates 10 to secure each pair of mating pre-molded inserts in one mating pair of window openings of the carrier plates, each retainer ring snapping into the recessed groove around the window openings 29B, the retainer ring having a resilience sufficient to allow motion of the insert in an X axis, Y axis and Z axis thereby forming a three-axis floating mold when the mating pre-molded inserts are moved together into a mating position in the molding process, thereby forming a multiple material assembly with mating pairs of three axis replaceable floating molds attached to a pair of removable carrier plates for use in production precision molding;

a fifth step of installing the multiple material assembly carrier plates in a precision molding device and using them for precision molding.

The first step preferably comprises fabricating at least one pair of removable carrier plates of a ferrous material having a plurality of pairs of mating window openings therein, each mating pair of mating window openings being of any given shape or desired quantity thereof in any mating location in the removable carrier plates.

The first and second steps preferably comprise fabricating removable carrier plates having pairs of mating window openings and pre-molding pairs of pre-molded inserts forming floating molds both configured for an encapsulation molding process to produce encapsulated semiconductor components and the fifth step comprises installing the mating pair of multiple material assembly carrier plates in an encapsulation molding device and inserting a lead frame between the mating pairs of pre-molded inserts and using them for encapsulated semiconductor molding.

The fifth step of installing the mating pair of carrier plates preferably comprises positioning a top carrier plate horizontally above and parallel to a mating bottom carrier plate in a production precision molding apparatus; and the fourth step preferably comprises inserting at least one top pre-molded insert in a window opening of the top carrier plate, and the second step comprises fabricating the top pre-molded insert comprising a top insert face facing downwardly for interfacing with a mating bottom insert face, facing upwardly in the bottom mating pre-molded insert, the mating pre-molded insert faces facing each other, each of the faces comprising a flat surface portion having a plurality of mating alignment elements adapted for automatic precision alignment of the mating pair of inserts during a molding process, each of the faces having a mating mold cavity 31 recessed in the flat surface portion communicating with the other mold cavity, each mating face further comprising an insert cavity seal 27 protruding from the flat surface portion along each of two opposing side edges of the mold cavity, the mating cavity seals comprising smooth elevated platforms maintaining the flat surface portions of the pre-molded insert faces spaced apart, thereby forming cavity vents 45, along the adjacent other two opposing side edges of the mold cavity allowing gases from the mold cavities to escape into the atmosphere; the top pre-molded insert further comprising a top surface opposite the bottom facing face, the top surface having a recessed area comprising a pot connected by at least one runner and at least one cavity gate communicating with top and bottom mold cavities for injecting liquefied synthetic material therein during a production precision molding process.

The second step preferably comprises pre-forming the faces of the pre-molded inserts so that the plurality of mating alignment elements adapted for automatic precision alignment of the mating pair of inserts comprises at least one hemispheric protruding dome 39 from one insert face automatically inserting in a at least one mating hemispherical recess 39 in the other mating insert face.

The second step further comprises pre-forming the faces of the pre-molded inserts so that the plurality of mating alignment elements adapted for automatic precision alignment of the mating pair of pre-molded inserts further comprises at least one locater pin 26 from bottom insert face extending perpendicularly upward to a tapering point, the locater pin adapted to protrude through an alignment hole of an external inserted lead frame 14 to engage the lead frame and secure it in a precise position, the locator pin further adapted to extend into a mating conical shaped recess in the mating top insert faces for precision aligning of the bottom pre-molded insert with the lead frame.

The method further comprises a step of transmitting a liquefied synthetic material to the assembly using a plunger rod 11 in a pot bushing 37 and a plunger tip 12 for injecting the liquefied synthetic material into the assembly, and a mating pot bushing structure for receiving the liquefied synthetic material into the pot on each top pre-molded insert, the plunger tip comprising a plunger core pin adapted for communicating with the pot bushing structure, the plunger tip further comprising two spherical shapes 40 and 41, one larger than the other, adapted for forming a cavity for the liquefied synthetic material to occupy and solidify the synthetic material within the two spherical shapes encasing the core pin so that the tip is adapted to extract the solidified material from the pot, runner and gate of the pre-molded insert upon removal without an ejector system; the pot bushing further comprising a pot bushing stripping angle and ledge 36 within a face of the bushing adapted for a stripping action of the core pin and separation from the two spherical shapes so that retraction of the plunger separates the solidified material from the plunger face.

In FIGS. 13-22, an alternate multiple piece carrier plate interlocking carrier assembly 50A embodiment comprises each of the mating pair of removable carrier plates 10A comprising an interlocking assembly of at least two interlocking partial carrier plates 5A and 5B. Each has at least one mating partial insert receptacle 42A and 42B adapted to receive a portion of one of the pair of pre-molded inserts 22A and 23A, 22B and 23B, 22C and 23C slidably therein, as shown in FIG. 13.

The at least one mating partial insert receptacle 42A of one partial carrier plate 5A adapted to the mate with a mating partial insert receptacle 42B of the other partial carrier plate 5B to form at least one full insert receptacle 10A adapted to receive at least one pre-molded insert of the pairs of pre-molded inserts 22A and 23A, 22B and 23B, 22C and 23C installed therein. The pre-molded insert comprises a dovetail connector 28B along opposing exterior side edges of the pre-molded inserts adapted to engage a mating dovetail connector 28A along opposing interior side edges of each of the mating pair of partial insert receptacles 42A and 42B in a sliding engagement during the interconnecting of the partial carrier plates 5A and 5B.

At least one pair of mating alignment structures interconnect between each of the pre-molded inserts and each of insert receptacles 10A. Preferably an edge locater half dome 6 on an inserted end of the pre-formed insert mates with a mating dome shaped recess 6A in the interior wall of the insert receptacle 10A for insuring proper installation of the pre-formed insert in the formed insert receptacle 42A and 42B of the interlocking partial carrier plates 5A and 5B. The at least two interlocking partial carrier plates are shown as three interlocking partial carrier plates: two outer partial carrier plates 5A and one inner partial carrier plate 5B adapted to be interlocked to form a removable carrier plate 10A inserted in one of a pair of carrier support frames 13A, adapted for use in a precision production molding process which may include encapsulation molding.

In FIGS. 20A and 20B, each of the pair of carrier support frames 13A comprises at least two mating locating spring plungers 44B, as shown in FIGS. 22A and 22B on opposing sides of the support frame to engage and position the partial carrier plates and at least two locking spring plungers 44A, as shown in FIGS. 21A and 21B, on opposing ends of the carrier support frame to engage and lock the partial carrier plates 5A and 5B together within the carrier support frame 13A to form a carrier plate assembly 50A.

In use, the alternate locked-in multi-carrier plate embodiment of the present invention, the first step comprises fabricating at least one pair of removable carrier plates of a ferrous material adapted for long-term use in a production precision molding machine comprises fabricating each of the mating pair of removable carrier plates formed as an interlocking assembly of at least two interlocking partial carrier plates 5A and 5B each having at least one mating partial insert receptacle 42A and 42B comprising dovetail connectors 28A along opposing interior side edges of each of the mating pair of partial insert receptacles adapted to receive a portion of one of the pair of pre-molded inserts 22A and 23A, 22B and 23B, 22C and 23C slidably therein, the at least one mating partial insert receptacle adapted to the mate with a mating partial insert receptacle of the other partial carrier plate to form at least one full insert receptacle 42A and 42B adapted to receive at least one pre-molded insert installed therein.

The second step comprises fabricating each of the pre-molded inserts 22A and 23A, 22B and 23B, 22C and 23C comprising a dovetail connector 28B along opposing exterior side edges of the pre-molded inserts adapted to engage a mating dovetail connector 28A along opposing interior side edges of each of the mating pair of partial insert receptacles 42A and 42B in a sliding engagement during the interconnecting of the partial carrier plates.

The method further comprises a step of interlocking the at least two partial removable carrier plates 5A and 5B, at least one pair of mating partial insert receptacles interconnecting receiving the least one pre-molded insert therein to form a combined material removable carrier plate and further comprising inserting the multi-piece removable carrier plate 10A in one of a pair of carrier support frames 13A, adapted for use in a precision production molding process which may include encapsulation molding.

In FIGS. 13, 20A and 20B each of the pair of carrier support frames 13A comprises at least two mating locating spring plungers 44B on opposing sides of the support frame to engage and position the at least two partial carrier plates 5A and 5B and at least two locking spring plungers 44A on opposing ends of the carrier support frame 13A to engage and lock the at least two partial carrier plates 5A and 5B together within the carrier support frame 13A and the interlocking step further comprises engaging the plungers with the partial carrier plates.

It is understood that the preceding description is given merely by way of illustration and not in limitation of the invention and that various modifications may be made thereto without departing from the spirit of the invention as claimed.

What is claimed is:

1. A multiple material carrier plate assembly with mating pairs of insertable, removable, replaceable non-ferrous pre-molded inserts each having at least one mold cavity, inserted into two removable carrier plates for use in precision molding, the assembly comprising:
    at least one mating pair of insertable, removable, replaceable non-ferrous pre-molded inserts each having at least one mold cavity, each of the pre-molded inserts comprising outer edge configurations adapted for aligning with and engaging a mating insert receptacle in a removable carrier plate for use in precision molding, each of the pre-molded inserts removably inserted in each of the mating insert receptacles in a floating fit configuration allowing each of the pre-molded inserts to float in all three axis within the insert receptacle allowing for self-aligning between the at least one mating pair of pre-molded inserts in the pair of removable carrier plates, the at least one pair of mating pre-molded inserts further comprising a plurality of pairs of mating alignment elements adapted for automatically lining up the at least one pair of mating pre-molded inserts precisely during a precision molding process, the at least one pair of mating pre-molded inserts fabricated of a nonferrous moldable material adapted for withstanding operating temperatures and compression pressure required for a production precision molding process;
    a mating pair of removable carrier plates adapted to be installed in a precision molding device, each of the carrier plates having at least one of a pair of mating insert receptacles for removably receiving and securing one of the at least one mating pair of pre-molded inserts removably installed within the at least one mating insert receptacle, the mating pair of removable carrier plates further comprising a plurality of precision mating elements arranged in a given pattern and position for precision alignment of the mating pair of carrier plates, the carrier plates fabricated of a ferrous material adapted for long-term use in a production precision molding apparatus;
    the mating pair of removable carrier plates comprising a top carrier plate positioned horizontally above and parallel to a mating bottom carrier plate in a production precision molding apparatus; the at least one mating pair of non-ferrous pre-molded inserts comprising at least one top pre-molded insert adapted to be inserted in the top carrier plate and at least one mating bottom pre-molded insert adapted to be inserted in the bottom carrier plate, the top pre-molded insert comprising a bottom mating contact face facing downwardly for interfacing with a mating bottom pre-molded insert mating contact face facing upwardly in the bottom mating carrier plate, the mating contact faces each comprising a flat surface portion having a plurality of mating alignment elements adapted for automatic precision alignment of the mating pair of pre-molded inserts, each mating insert face having a mating mold cavity recessed in the flat surface portion communicating with the other mold cavity on the other mating face;
    the at least one top pre-molded insert further comprising a top surface opposite the bottom mating contact face, the top surface having a recessed area comprising a pot connected by at least one runner and at least one cavity gate communicating with top and bottom mold cavities for injecting liquefied synthetic material therein during a production precision molding process;
    and further comprising an injector structure comprising a plunger and pot bushing structure adapted for communicating with the pot, the structure comprising a plunger rod in a pot bushing adapted for transmitting liquefied synthetic material to the assembly, the plunger comprising a plunger tip at a lower end of the plunger configured to inject the liquefied synthetic material into the pot and mating mold cavities, and a mating pot bushing structure configured to receive the liquefied synthetic material for transmitting the liquefied synthetic material to the pot on each top pre-molded insert, the plunger tip further comprising a plunger core pin adapted for communicating with the pot bushing structure, and the plunger tip further comprising a structure having a cavity adapted for receiving the liquefied synthetic material to occupy the cavity and solidify therein, the synthetic material within the cavity encasing the core pin so that the tip is adapted to extract the solidified material from the pot, the runner, and the gate of the pre-molded insert without an ejector system; the pot bushing further comprising an angled surface and ledge within a face of the bushing adapted for a stripping action of the core pin and separation from the cavity structure so that retraction of the plunger separates the solidified material from the plunger face for automatic removal of surplus injected material after each molding cycle, thereby eliminating any need for an ejector system and eliminating any need for a runner system;
    thereby providing a multiple material carrier plate assembly with mating pairs of insertable, removable, replaceable non-ferrous pre-molded inserts each having at least one mold cavity, inserted into two removable carrier plates for use in precision molding.

2. The assembly of claim 1 wherein each mating face further comprising an insert cavity seal protruding from the flat surface portion along each of two opposing side edges of the mold cavity, the mating cavity seals comprising smooth elevated platforms maintaining the flat surface portions of the pre-molded insert faces spaced apart, thereby forming cavity vents, along the adjacent other two opposing side edges of the mold cavity allowing gases from the mold cavities to escape into the atmosphere.

3. The assembly of claim 1 wherein the pairs of mating insert receptacles and the paired floating pre-molded insert molds are configured for an encapsulation molding process and further comprising a lead frame installed between the pairs of mating pre-molded inserts with the multiple material assembly removable carrier plates installed in a production precision molding apparatus to produce encapsulated semiconductor components.

4. The assembly of claim 1 comprising the at least one pair of removable carrier plates being fabricated of a ferrous material having a plurality of pairs of mating insert receptacles therein, each mating pair of mating insert receptacles being of any given shape or desired quantity thereof in any mating location in the removable carrier plates.

5. The assembly of claim 1 wherein each of the mating pair of removable carrier plates comprises an interlocking assembly of at least two interlocking partial carrier plates each having at least one mating partial insert receptacle adapted to receive a portion of one of the pair of pre-molded inserts slidably therein, the at least one mating partial insert receptacle adapted to mate with a mating partial insert receptacle of the other partial carrier plate to form at least one full insert receptacle adapted to receive at least one pre-molded insert installed therein, the pre-molded insert comprising a dovetail connector along opposing exterior side edges of the pre-molded inserts adapted to engage a mating dovetail connector along opposing interior side edges of each of the mating pair of partial insert receptacles in a sliding engagement during the interconnecting of the partial carrier plates, and further comprising at least one pair of mating alignment structures interconnecting between each of the at least one pre-molded insert and each of the at least one insert receptacle, the at least two interlocking partial carrier plates adapted to be interlocked to form a removable carrier plate inserted in one of a pair of carrier support frames, adapted for use in a precision production molding process which may include encapsulation molding.

6. The assembly of claim 5 wherein each of the pair of carrier support frames comprises at least two mating locating spring plungers on opposing sides of the support frame to engage and position the at least two partial carrier plates and at least two locking spring plungers on opposing ends of the carrier support frame to engage and lock the at least two partial carrier plates together within the carrier support frame.

7. The assembly of claim 1 wherein the mating pair of removable carrier plates comprises a pair of metallic plates each having at least one of a pair of mating window openings, with one of the window openings in each of the mating carrier plates, adapted for aligning with the other mating window opening when the carrier plates are moved together in a molding process, each of the window openings having a continuous recessed groove in an interior edge of the window opening around the entire window opening;

each of the pair of pre-molded inserts being adapted to be inserted in one of the mating window openings, each of the pair of pre-molded inserts comprising a continuous groove around an entire outside perimeter edge;

further comprising a resilient rubber-like preformed retainer ring stretched around each of the pre-molded inserts perimeter edge and each tension fit into the continuous groove encircling the perimeter edge with a portion of the retainer ring extending outside of the perimeter edge of the pre-molded insert, so that each insert is adapted to be inserted into one of the window openings with the retainer ring snapping into the recessed groove around the window opening so that the pre-molded insert is adapted to be insertable, removable and replaceable, the retainer ring having a resilience sufficient to allow motion of the insert in an X axis, Y axis and Z axis thereby forming a three-axis floating mold, the mating pre-molded inserts being adapted to be moved together into a mating position by aligning and bringing together the pair of carrier plates for use in a precision molding process, the retainer ring fabricated of a nonferrous rubberlike material adapted for withstanding the operating temperatures required for production precision molding;

thereby forming a multiple material carrier plate assembly with mating pairs of three axis floating replaceable pre-molded inserts each having at least one mold cavity, inserted into window openings in two removable carrier plates for use in precision molding.

8. A multiple material carrier plate assembly molding method using insertable, removable, replaceable non-ferrous pre-molded inserts each having at least one mold cavity, removably inserted into two removable carrier plates for use in precision molding, the method comprising:

a first step of fabricating at least one pair of removable carrier plates of a ferrous material adapted for long-term use in a production precision molding machine, each of the pair of carrier plates having a mating matrix of insert receptacles arranged in a given pattern and precision position for precision alignment of the mating pair of carrier plates, the at least one pair of carrier plates having at least one pair of mating insert receptacles, having one of the mating pair of insert receptacles in each carrier plate, the pair of mating insert receptacles mutually aligning when the carrier plates are moved together in a molding process;

a second step of pre-molding at least one pair of insertable, removable, replaceable non-ferrous pre-molded inserts each having at least one mold cavity, each of the pre-molded inserts comprising outer edge configurations adapted for aligning with and engaging a mating insert receptacle in a removable carrier plate for use in precision molding, each of the mating pair of pre-molded inserts further comprising a plurality of pairs of mating alignment elements for automatically lining up the at least one pair of mating pre-molded inserts precisely during the mating of the at least one pair of pre-molded inserts in the molding process, the mating pre-molded inserts fabricated of a nonferrous pre-molded material adapted for withstanding operating temperatures and compression pressure required for a production precision molding process;

a third step of inserting at least one mating pair of the pre-molded inserts into a mating pair of insert receptacles in the pair of mating carrier plates, each of the pre-molded inserts removably inserted in each of the mating insert receptacles in a floating fit configuration allowing each of the pre-molded inserts to float in all three axis within the insert receptacle allowing for self-aligning between the at least one mating pair of pre-molded inserts in the pair of removable carrier plates, thereby forming a multiple material assembly with mating pairs of three axis replaceable pre-molded insert floating molds attached to at pair of removable carrier plates for use in production precision molding;

a fourth step of installing the pair of mating removable plates in a production precision molding machine, the mating pair of removable carrier plates comprising a top carrier plate positioned horizontally above and parallel to a mating bottom carrier plate in the production precision molding apparatus; the at least one mating pair of non-ferrous pre-molded inserts comprising at least one top pre-molded insert adapted to be inserted in the top carrier plate and at least one mating bottom pre-molded insert adapted to be inserted in the bottom carrier plate, the top pre-molded insert comprising a bottom mating contact face facing downwardly for interfacing with a mating bottom pre-molded insert mating contact face facing upwardly in the bottom mating carrier plate, the mating contact faces each comprising a flat surface portion having a plurality of mating alignment elements adapted for automatic precision alignment of the mating pair of pre-molded inserts, each mating insert face having a mating mold cavity recessed in the flat surface portion communicating with the other mold cavity on the other mating face, the at least one top pre-molded insert further comprising a top surface opposite the bottom mating contact face, the top surface having a recessed area comprising a pot connected by at least one runner and at least one cavity gate communicating with top and bottom mold cavities for injecting liquefied synthetic material therein during a production precision molding process;

a fifth step of installing on the top surface of each of the top pre-molded inserts an injector structure comprising a plunger and pot bushing structure adapted for communicating with the pot, the structure comprising a plunger rod in a pot bushing adapted for transmitting liquefied synthetic material to the assembly, the plunger comprising a plunger tip at a lower end of the plunger configured to inject the liquefied synthetic material into the pot and mating mold cavities, and a mating pot bushing structure configured to receive the liquefied synthetic material for transmitting the liquefied synthetic material to the pot on each top pre-molded insert, the plunger tip further comprising a plunger core pin adapted for communicating with the pot bushing structure, and the plunger tip further comprising a structure having a cavity adapted for receiving the liquefied synthetic material to occupy the cavity and solidify therein, the synthetic material within the cavity encasing the core pin so that the tip is adapted to extract the solidified material from the pot, the runner, and the gate of the pre-molded insert without an ejector system; the pot bushing further comprising an angled surface and ledge within a face of the bushing adapted for a stripping action of the core pin and separation from the cavity structure so that retraction of the plunger separates the solidified material from the plunger face for automatic removal of surplus injected material after each molding cycle, thereby eliminating any need for an ejector system and eliminating any need for a runner system;

a sixth step of using the multiple material assembly carrier plates in a precision molding device for precision molding;

thereby performing a multiple material carrier plate assembly molding method using insertable, removable, replaceable non-ferrous pre-molded inserts each having at least one mold cavity, removably inserted into two removable carrier plates for use in precision molding.

9. The method of claim 8 wherein the second step further comprises fabricating each mating face further comprising an insert cavity seal protruding from the flat surface portion along each of two opposing side edges of the mold cavity, the mating cavity seals comprising smooth elevated platforms maintaining the flat surface portions of the pre-molded insert faces spaced apart, thereby forming cavity vents, along the adjacent other two opposing side edges of the mold cavity allowing gases from the mold cavities to escape into the atmosphere.

10. The method of claim 8 wherein the first and second steps comprise fabricating removable carrier plates having pairs of mating window openings and pre-molding pairs of pre-molded inserts forming floating molds both configured for an encapsulation molding process to produce encapsulated semiconductor components and the fifth step comprises installing the mating pair of multiple material assembly carrier plates in an encapsulation molding device and inserting a lead frame between the mating pairs of pre-molded inserts and using them for encapsulated semiconductor molding.

11. The method of claim 8 wherein the first step comprises fabricating at least one pair of removable carrier plates of a ferrous material having a plurality of pairs of mating insert receptacles therein, each mating pair of mating insert receptacles being of any given shape or desired quantity thereof in any mating location in the removable carrier plates.

12. The method of claim 8 wherein the first step of first fabricating at least one pair of removable carrier plates of a ferrous material adapted for long-term use in a production precision molding machine comprises fabricating each of the mating pair of removable carrier plates formed as an interlocking assembly of at least two interlocking partial carrier plates each having at least one mating partial insert receptacle comprising dovetail connectors along opposing interior side edges of each of the mating pair of partial insert receptacles adapted to receive a portion of one of the pair of pre-molded inserts slidably therein, the at least one mating partial insert receptacle adapted to the mate with a mating partial insert receptacle of the other partial carrier plate to form at least one full insert receptacle adapted to receive at least one pre-molded insert installed therein, and the second step comprises fabricating each of the pre-molded inserts comprising a dovetail connector along opposing exterior side edges of the pre-molded inserts adapted to engage a mating dovetail connector along opposing interior side edges of each of the mating pair of partial insert receptacles in a sliding engagement during the interconnecting of the partial carrier plates and further comprising a step of interlocking the at least two partial removable plates, at least one pair of mating partial insert receptacles interconnecting receiving the least one pre-molded insert therein to form a combined material removable carrier plate and further comprising inserting the removable carrier plate in one of a pair of carrier support frames, adapted for use in a precision production molding process which may include encapsulation molding.

13. The method of claim 12 wherein each of the pair of carrier support frames comprises at least two mating locating spring plungers on opposing sides of the support frame to engage and position the at least two partial carrier plates and at least two locking spring plungers on opposing ends of the carrier support frame to engage and lock the at least two partial carrier plates together within the carrier support frame and the interlocking step further comprises engaging the plungers with the partial carrier plates.

14. The method of claim 8 wherein the first step comprises fabricating the mating pair of removable carrier plates to form a pair of metallic plates each having at least one of a pair of mating window openings, with one of the window openings in each of the mating carrier plates, adapted for aligning with the other mating window opening when the carrier plates are moved together in a molding process, each of the window openings having a continuous recessed groove in an interior edge of the window opening around the entire window opening;

the second step comprising each of the pair of pre-molded inserts being adapted to be inserted in one of the mating window openings, each of the pair of pre-molded inserts comprising a continuous groove around an entire outside perimeter edge;

the third step comprising stretching a resilient rubber-like preformed retainer ring around each of the pre-molded inserts perimeter edge and tension fitting the retainer ring into the continuous groove encircling the perimeter edge with a portion of the retainer ring extending outside of the perimeter edge of the pre-molded insert, inserting each of the pre-formed inserts and retainer rings into one of the window openings with the retainer ring snapping into the recessed groove around the window opening so that the pre-molded insert is adapted to be insertable, removable and replaceable, the retainer ring having a resilience sufficient to allow motion of the insert in an X axis, Y axis and Z axis thereby forming a three-axis floating mold;

the fourth step comprising bringing the mating pre-molded inserts together into a mating position by aligning and bringing together the pair of carrier plates for use in a precision molding process, the retainer ring fabricated of a nonferrous rubberlike material adapted for withstanding the operating temperatures required for production precision molding;

thereby performing a multiple material carrier plate method with mating pairs of three axis floating replaceable pre-molded inserts each having at least one mold cavity, inserted into window openings in two removable carrier plates for use in precision molding.

* * * * *